US005369401A

United States Patent [19]

Haines

[11] Patent Number: 5,369,401

[45] Date of Patent: Nov. 29, 1994

[54] REMOTE METER OPERATION

[75] Inventor: John G. Haines, Oakland, Calif.

[73] Assignee: f.m.e. Corporation, Hayward, Calif.

[21] Appl. No.: 777,776

[22] Filed: Oct. 15, 1991

Related U.S. Application Data

[63] Continuation-in-part of Ser. No. 328,112, Mar. 23, 1989, Pat. No. 5,077,660, and Ser. No. 327,779, Mar. 23, 1989, Pat. No. 5,107,455, and Ser. No. 327,487, Mar. 23, 1989, Pat. No. 5,058,025, and Ser. No. 614,054, Nov. 9, 1990, abandoned, which is a continuation of Ser. No. 328,099, Mar. 23, 1989, abandoned.

[51] Int. Cl.[5] .......................... G06F 7/04; G06F 15/20

[52] U.S. Cl. .......................... 340/825.35; 364/464.02

[58] Field of Search .................... 235/382, 382.5, 375, 235/380; 364/464.01, 464.02; 340/825.35

[56] References Cited

U.S. PATENT DOCUMENTS

| | | | |
|---|---|---|---|
| 3,034,329 | 5/1962 | Pitney et al. | 70/314 |
| 3,654,604 | 4/1972 | Crafton | 340/147 R |
| 3,792,446 | 2/1974 | McFiggins et al. | 340/172.5 |
| 3,798,359 | 3/1974 | Feistel | 178/22 |
| 3,798,360 | 3/1974 | Feistel | 178/22 |
| 3,800,284 | 3/1974 | Zucker et al. | 340/149 R |
| 3,860,911 | 1/1975 | Hinman et al. | 340/149 R |
| 3,866,173 | 2/1975 | Moorman et al. | 340/149 A |
| 4,097,923 | 6/1978 | Eckert, Jr. et al. | 364/900 |
| 4,137,564 | 1/1979 | Spencer | 364/200 |
| 4,182,933 | 1/1980 | Rosenblum | 179/1.5 R |
| 4,222,518 | 9/1980 | Simjian | 235/375 |
| 4,226,360 | 10/1980 | Simjian | 235/375 |
| 4,249,071 | 2/1981 | Simjian | 235/375 |
| 4,253,158 | 2/1981 | McFiggans | 364/900 |
| 4,280,179 | 7/1981 | Jones, Jr. et al. | 364/464 |
| 4,280,180 | 7/1981 | Eckert et al. | 364/464 |
| 4,302,821 | 11/1981 | Eckert et al. | 364/900 |
| 4,310,720 | 1/1982 | Check, Jr. | 178/22.08 |
| 4,314,097 | 2/1982 | Campbell, Jr. | 178/22.08 |
| 4,376,299 | 3/1983 | Rivest | 364/900 |
| 4,424,573 | 1/1984 | Eckert, Jr. et al. | 364/900 |
| 4,439,670 | 3/1984 | Basset et al. | 235/382 |
| 4,447,890 | 5/1984 | Duwel et al. | 364/900 |
| 4,481,513 | 11/1984 | Mole et al. | 340/825.31 |
| 4,481,604 | 11/1984 | Gilham et al. | 364/900 |
| 4,484,307 | 11/1984 | Quatse et al. | 364/900 |
| 4,528,644 | 7/1985 | Soderberg et al. | 364/900 |
| 4,534,056 | 8/1985 | Feilchenfeld et al. | 381/42 |
| 4,562,535 | 12/1985 | Vincent et al. | 364/200 |
| 4,580,144 | 4/1986 | Calvi | 346/76 PH |
| 4,589,088 | 5/1986 | Place | 364/900 |
| 4,629,871 | 12/1986 | Scribner et al. | 235/375 |
| 4,636,975 | 1/1987 | Soderberg et al. | 364/900 |
| 4,755,815 | 7/1988 | Savoyet et al. | 340/825.31 |
| 4,775,246 | 10/1988 | Edelmann et al. | 380/23 |
| 4,775,931 | 10/1988 | Dickie et al. | 364/200 |
| 4,783,745 | 11/1988 | Brookner et al. | 364/464.02 |
| 4,787,045 | 11/1988 | Storace et al. | 364/464.02 |
| 4,812,992 | 3/1989 | Storace et al. | 364/464.02 |
| 4,812,994 | 3/1989 | Taylor et al. | 364/464.02 |
| 4,837,714 | 6/1989 | Brookner et al. | 364/550 |
| 4,868,783 | 9/1989 | Anderson et al. | 364/900 |

FOREIGN PATENT DOCUMENTS

| | | | |
|---|---|---|---|
| 2636852 | 5/1982 | Germany | H04M 11/06 |

*Primary Examiner*—Donald Hajec
*Assistant Examiner*—Jeffrey R. Filipek
*Attorney, Agent, or Firm*—Townsend and Townsend Khourie and Crew

[57] ABSTRACT

A technique for reconfiguring in the field postage meters having a set of features that may be selectively enabled or disabled by software. The technique provides security so that the meter company will always have a correct record of the configuration of the meter in the field. A technique is provided for reconfiguring in the field of external devices in communication with postage meters, the external devices having an external device feature set that may be selectively enabled or disabled by software. A technique for securely adding postage to a remote setting postage meter without the remote setting code is also provided. A technique for detecting the entry of an invalid code for remote setting the meter a predetermined number at times is also provided. Once detected, a security lock flag stored in memory is set which prevents the meter from being reset until the flag is cleared in a separate procedure.

8 Claims, 22 Drawing Sheets

REMOTE METER OPERATION

CROSS-REFERENCE TO RELATED APPLICATIONS

This application is a continuation-in-part of the following four patent applications: "REMOTE METER CONFIGURATION," Ser. No. 328,112, filed Mar. 23, 1989 U.S. Pat. No. 5,077,660; "REMOTE METER I/O CONFIGURATION," Ser. No. 327,779 U.S. Pat. No. 5,107,455, filed Mar. 23, 1989; "EMERGENCY POST OFFICE SETTING FOR REMOTE SETTING METER," Ser. No. 327,487 U.S. Pat. No. 5,058,025, filed Mar. 23, 1989; and "SECURITY EXTENSION PROCEDURE FOR REMOTE SETTING METER," Ser. No. 614,054 now abandoned, filed Nov. 9, 1990, which is a File Wrapper Continuation of Ser. No. 328,099 now abandoned, filed Mar. 23, 1989, all incorporated herein by reference for all purposes.

BACKGROUND OF THE INVENTION

With the advent of electronic postage meters, it has become possible to offer meter customers a large number of optional features. Each additional feature, however, creates a larger number of possible combinations of features. Therefore, in order for a meter company to provide a large selection of features, it must maintain a large inventory of meters. This is costly and inefficient. In rental or lease markets, the inventory problem is increased by customer demands for a replacement meter of like features when the meter in service is damaged or fails.

A customer needing to replace the meter or wanting to change the features on his meter must wait for the agent of the meter company to obtain a meter having the desired set of features. If the agent does not have a large inventory, it becomes necessary to have a meter configured at the factory. Therefore, any attempts to reduce the number of meters in the pipeline will adversely affect the length of time necessary to service the customer's request.

In another approach, the meter company may provide external devices that include all the desired features, but are disabled in some manner. Although this approach provides great flexibility, it does not provide much security. A customer may easily be able to enable unauthorized features himself by inspecting and manipulating the devices or by observing an agent enabling or disabling the desired features. Furthermore, an agent may enable the desired features without notifying the company. As a result, the company may have a large amount of lost profits due to unauthorized feature use.

Furthermore, electronic postage meters have made it possible to offer meter customers the feature of remotely adding postage credit (remote setting) to the postage meter. This feature enables the customer to more readily and conveniently remotely set the amount of postage in the meter. Extensive procedures and controls are used to insure that the postage amount is remotely set only when authorized. For example, the customer is usually required to enter a long code that varies each time the meter is remotely set. However, there may be a time delay between the time customer first initiates the process of obtaining the remote setting code and the time the customer receives the remote setting code. In addition, the customer may not be able to remotely set the meter due to a low customer account balance. Moreover, such procedures are not infallible, particularly when the postage meter has been stolen and in the possession of a persistent person.

SUMMARY OF THE INVENTION

In a first embodiment, referred to herein as "remote meter configuration," the present invention provides a technique for securely reconfiguring postage meters in the field, thereby allowing variation of the features of the meter. The technique is readily implemented in the meter software. Because the technique provides security over the meter reconfiguration process, only authorized meter reconfigurations can occur. Therefore, the company will always have a correct record of the configuration of the meter in the field.

The technique assumes that the meter has a set of features that may be selectively enabled or disabled by software. The meter is capable of being put into a configuration mode by suitable entries from the keyboard, in which mode it is inhibited from printing postage. The meter has a storage register for a current or old meter type, and can receive a desired new meter type via keyboard entry. The meter has software for generating an encrypted configuration request code that is partially based on the values of the old and new meter types. The configuration request code, when communicated to a data center computer along with other validating identification information, is checked by the data center computer which computes the configuration request code using the same algorithm. If the two values agree, the data center computer generates an encrypted configuration enable code that is partially based on the meter serial number. This is communicated to the meter, which receives the meter generated configuration enable code and also generates an internal configuration enable code using the same algorithm as the data center computer. If the configuration enable codes agree, the meter overwrites the old meter type number with the new meter type number, thereby reconfiguring the meter.

In a second embodiment referred to herein as "remote meter I/O configuration," the present invention provides an improved technique for selectively enabling features in generic external devices by reconfiguring postage meters in the field. This technique is also readily implemented in the meter software, and provides security so that the meter company will always have a correct record of the external device feature set enabled by the meter in the field. This technique assumes that the external devices in communication with the meter have features that may be selectively enabled or disabled by software.

The meter is reconfigured by first putting the meter into a I/O configuration mode by suitable entries from the keyboard. In this mode, the meter is inhibited from printing postage. The meter has a storage register for a current or old I/O configuration number (IOCN). A desired new IOCN is entered via keyboard entry. The meter software generates an encrypted I/O configuration request code that is partially based on the value of the new IOCN. The I/O configuration request code is communicated to a data center computer along with other validating identification information. The data center computer checks the code by computing the I/O configuration request code using the same algorithm. If the two values agree, the data center computer generates an encrypted I/O configuration enable code that is partially based on the meter serial number. This is communicated to the meter, which receives the computer generated I/O configuration enable code and also generates an internal I/O configuration enable code using the same encryption algorithm as the data center computer. If the I/O configuration enable codes agree, the meter overwrites the old IOCN with the new IOCN in permanent storage. The external devices in communication with the meter may then read the IOCN and implement the feature set represented by the IOCN.

As a result of this technique, generic external devices may be manufactured that are capable of being configured to meet the customer's needs. Because the technique utilizes encrypted communication with the data center computer, the factory maintains control over and knowledge of the feature set of meter external devices in the field. This technique also allows the feature set to be modified at the customer site (i.e., remotely) without the presence of a company agent, thereby improving customer service.

In a third embodiment referred to herein as "emergency post office setting for remote setting meter," the present invention provides a technique for securely adding postage to a remote setting postage meter without the remote setting code. This technique is readily implemented in the meter software. During this technique, the meter is manually set by a post office clerk by putting the meter into a post office mode by pressing selected keys, entering the desired amount of postage, and exiting the mode. After exiting the mode, the meter is capable of printing postage. After printing some nonzero postage, the customer notifies a data center computer of the manual setting by performing an emergency clear procedure. First, the customer puts the meter into a remote setting mode by pressing selected keys. In this mode, the meter will generate and display an emergency request code. The customer passes the emergency request code with other identifying information to the data center computer. The computer generates its own emergency request code and compares the codes. If they are equal, then the computer will communicate an emergency enable code to the customer for entry into the meter. Upon confirmation against an internally generated emergency enable code, the meter will enable itself to be remotely set again.

In a fourth embodiment referred to herein as "security extension procedure for resettable meter," the present invention provides a technique for detecting the entry of an invalid code for remote setting the meter a predetermined consecutive number at times. Once detected, a security lock flag stored in memory is set which prevents the meter from being reset until the flag is cleared in a separate procedure. In alternative embodiments, the flag may also prevent the meter from printing postage until the flag is cleared.

This technique provides for clearing the security lock flag without having to return the meter to the factory. During this technique, the meter generates a security lock code which is transmitted to a data center computer. The data center computer compares the security lock code with an internally generated security lock code. If the codes agree, the data center computer then generates a security clear code which is transmitted to the meter. The meter then compares this code with an internally generated security clear code. If these codes agree, then the meter clears the security lock flag thereby allowing the customer to remotely set the meter.

DESCRIPTION OF THE PREFERRED EMBODIMENT

The present invention provides four basic embodiments under the headings: I. Remote Meter Configuration; II. Remote Meter I/O Configuration; III. Emergency Post Office Setting For Remote Setting Meter; and IV. Detection of Entry of Invalid Remote Setting Code. Within each one of the above basic embodiments other alternative embodiments are disclosed.

I. REMOTE METER CONFIGURATION

Meter Overview: Structure

Figure 1:
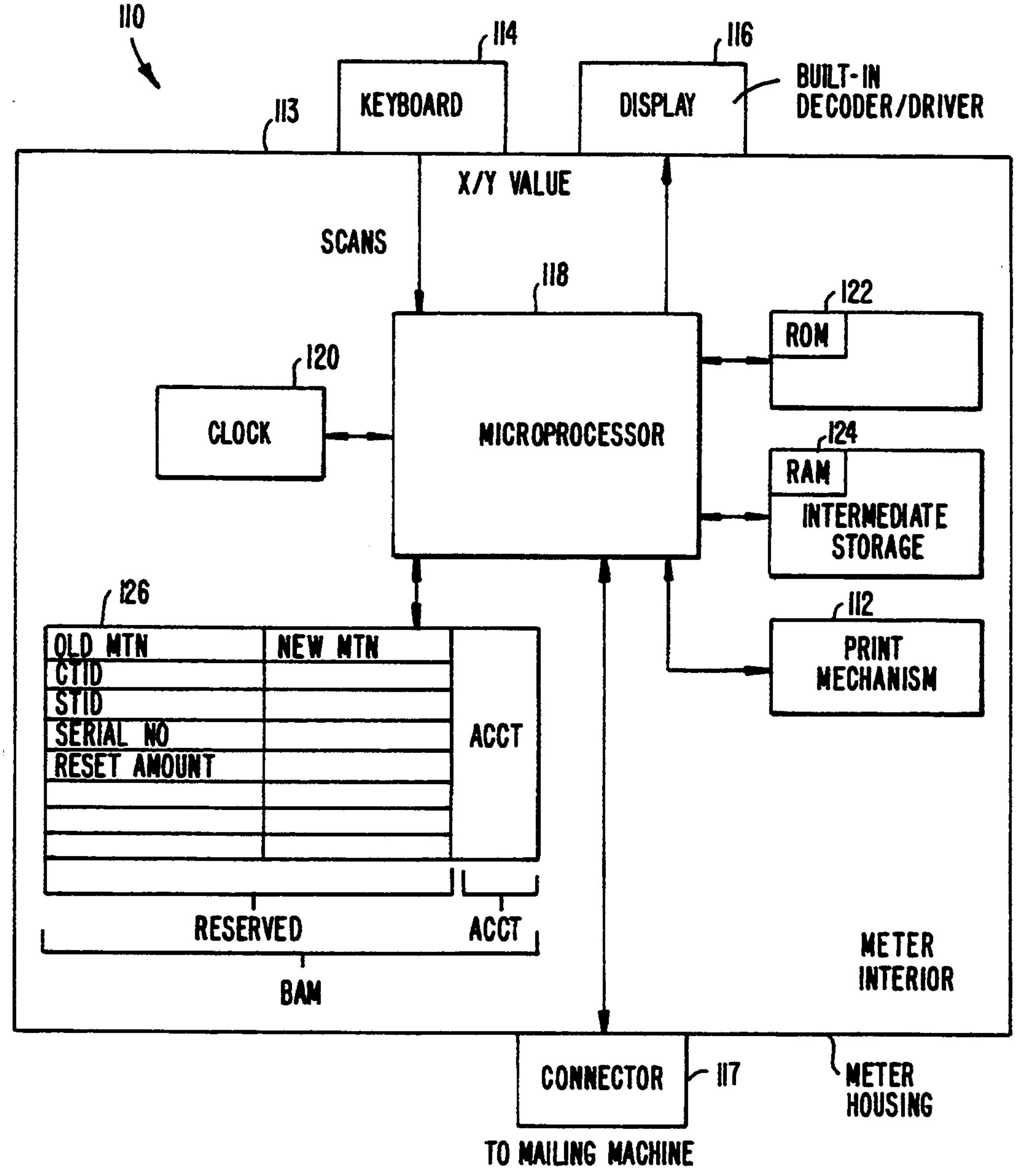
FIG. 1 is a block diagram of a preferred postage meter capable of being reconfigured in the field.

FIG. 1 is a block diagram of a preferred postage meter 110 that can be reconfigured in the field. Meter 110 includes a print mechanism 112, accounting registers, and control electronics, all enclosed within a secure meter housing 113. A keyboard 114 and a display 116 provide the user interface. A connector 117 provides an electrical connection with a mailing machine for control of the printing process. The control electronics includes a digital microprocessor 118 which controls the operation of the meter, including the basic functions of printing and accounting for postage, and optional features such as department accounting and remote setting. The microprocessor is connected to a clock 120, a read only memory (ROM) 122, a random access memory (RAM) 124, and a battery augmented memory (BAM) 126.

ROM 122 is primarily used for storing nonvolatile information such as software and data/function tables necessary to run the microprocessor. The ROM can only be changed at the factory. RAM 124 is used for intermediate storage of variables and other data during meter operation. BAM 126 is primarily used to store accounting information that must be kept when the meter is powered down. The BAM is also used for storing certain flags and other information that is necessary to the functioning of the microprocessor. Such information includes meter identifying data such as the meter serial number and BAM initialization date, and a number of parameters relevant to the remote configuration of the meter.

The meter is provided with a number of features that may be enabled or disabled by software. Representative features include department accounting (with various levels of sophistication and numbers of departments that can be tracked), set date prompt, low postage warning, calculator mode variable length security codes, and remote setting. The remote setting feature is a capability of having the meter's postage amount increased without removing the meter from the customer site. In a first embodiment of the invention, the meter postage amount can be increased by a variable amount during the remote setting process. Alternatively, in a second embodiment of the invention, the meter postage amount can be increased by a fixed increment called the fixed remote setting amount. The fixed remote setting amount may then be varied during remote configuration of the meter. Additionally, the meter may have four print wheels (maximum postage $99.99), but the high order print wheel may be disabled (maximum postage $9.99).

In the first and second embodiments, certain meter features are hardware configured and cannot be set by software. This includes the print indicium (U.S. Postal Service or United Parcel Service) and the position of the decimal point (four-bank whole cents or four-bank decimal cents). These features may be software controlled and configurable in alternative embodiments of the invention.

Whether a feature or a feature set is enabled is controlled by a meter type number (MTN) representing the set of features enabled. The MTN is stored in BAM and is checked by the microprocessor during meter power-up and at some branch points in the software.

Meter Overview: Operation

In order to simplify the software and enhance microprocessor performance in the first and second embodiments, the microprocessor performs several initialization procedures during meter power-up. In some of the initialization procedures, the microprocessor uses the MTN stored in BAM to index in RAM the software code stored in ROM to tables also stored in ROM. This indexing allows the microprocessor to more quickly read the proper tables for information without having to repeatedly determine what table to read.

One indexed table is a Meter Selection Table which contains information regarding what features the meter has based upon the MTN and the type of meter (i.e., U.S. Postal Service or United Parcel Service, four-bank whole cents or four-bank decimal cents, etc.). Another indexed table is a Key Table which contains the address of the appropriate software code to be executed when a key is pressed by the user. The Key Table indexing is also partially based upon the MTN. After the initialization procedures are performed, the microprocessor waits for user input.

The microprocessor is able to determine user input by periodically scanning the keyboard. As a key is pressed, x and y coordinate values are determined by the microprocessor. The microprocessor converts the x and y coordinate values to an equivalent ASCII byte. The microprocessor sends the ASCII byte to the display, which contains its own internal decoder and driver for displaying the ASCII information to the user. The microprocessor then determines what software code in ROM to execute based upon the ASCII byte by reading the indexed Key Table in ROM.

The software code contains branch points where the microprocessor must read a table in ROM or a variable in BAM to determine which code to execute. For example, the microprocessor may read the indexed Meter Selection Table to determine whether the meter is configured to have a certain feature or not and thereby execute the appropriate code.

Upon the execution of the appropriate software code, the microprocessor returns to a scanning state as it waits for further user input.

Meter Relationship with the Data Center Computer

In the first and second embodiments, the meter is configured to a standard feature set before leaving the factory. Because the feature set is known, the meter can be functional and still does not need to be registered on the data center computer until it has been reconfigured a first time. In an alternative embodiments, the meter embodiments can be placed in a disabled state for security reasons until it has been reconfigured a first time.

During the reconfiguration process, the meter's serial number, present configuration and other information specific to the meter (which were already stored in the meter's memory during an initialization process at the factory) are entered on the data center computer. The meter and the computer are then able to generate identical encrypted codes by using the same encryption routine and input numbers. The encrypted codes help the data center computer maintain control over the feature set of each meter.

Two input numbers used by the meter and the computer to generate encrypted codes are the configuration transaction identifier ("CTID") and the setting transaction identifier ("STID"). They are both specific to the meter and dependent upon the meter serial number. They may also be incremented after each use. The CTID is normally used for reconfiguring the meter functions and the STID is normally used for remote setting the meter postage. Separate numbers are used for the separate procedures in order to maximize security and minimize complexity caused by interdependence. The encryption routine is described in greater detail below.

Meter Configuration Method

Figure 2:
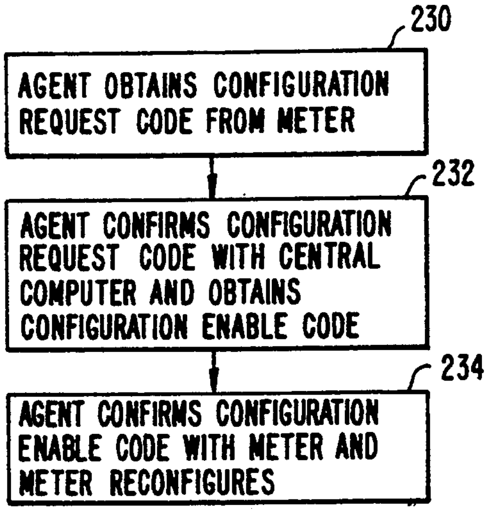
FIG. 2 is a high level flowchart of the process for reconfiguring the postage meter.

FIG. 2 is a high level flowchart of the process necessary for reconfiguring the postage meter by an agent at a customer's site or at the agent's technical service area. In a first stage 230, the agent obtains a configuration request code generated by the meter. This configuration request code is essentially a password to the data center computer, and is based upon a combination of factors, the combination of which only the data center computer would know. In a second stage 232, the agent confirms the configuration request code with the data center computer. Upon confirmation from the computer, the computer provides a configuration enable code back to the agent. The configuration enable code is essentially a password from the data center computer to the meter stating that it is permissible to reconfigure to the desired feature set. In a third stage 234, the agent enters the configuration enable code into the meter. The meter confirms the configuration enable code and reconfigures itself.

Figure 3:
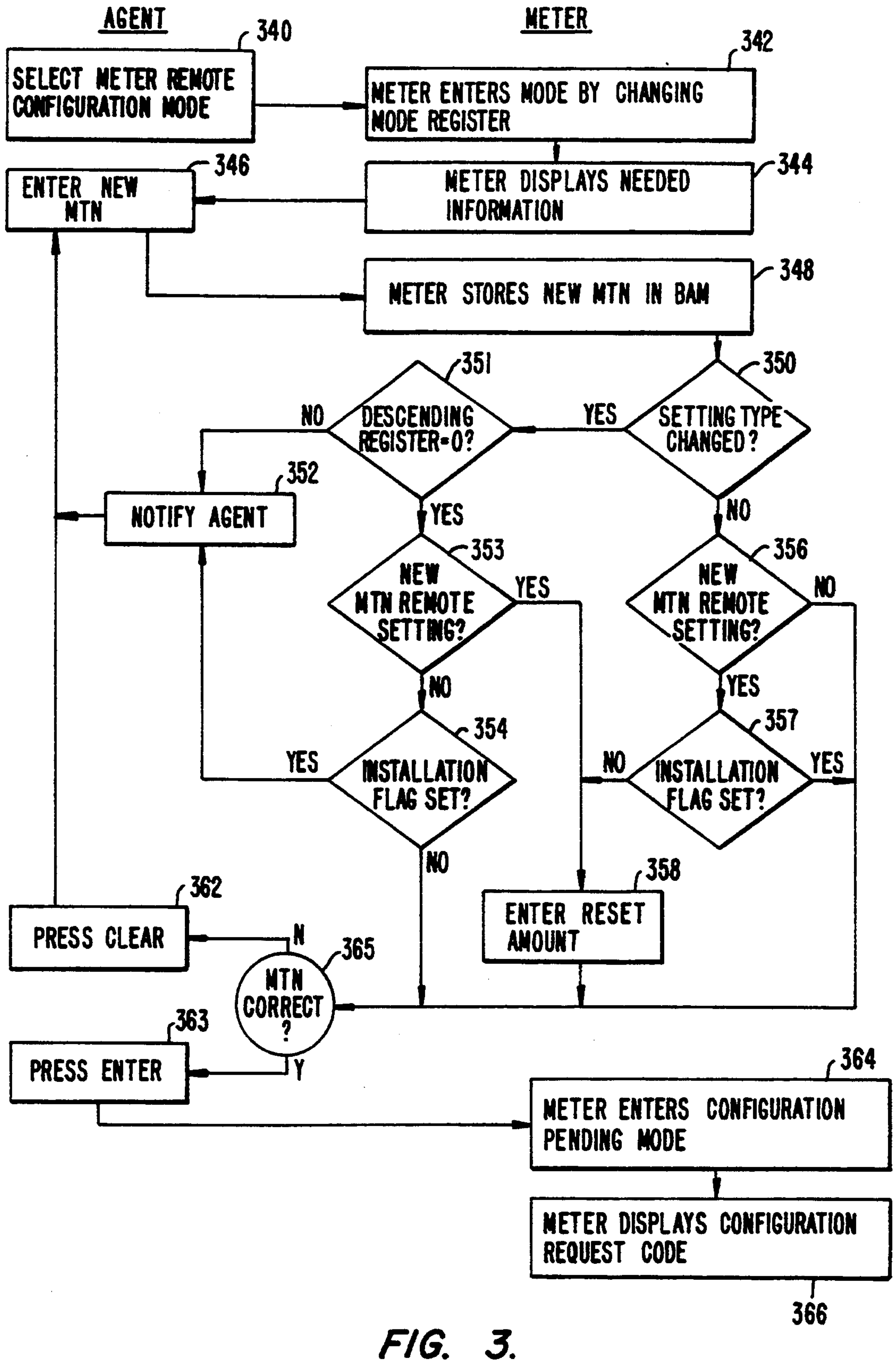
FIG. 3 is a detailed flowchart of the procedure for the agent to obtain a configuration request code generated by the meter in the second embodiment.

FIG. 3 is a detailed flowchart of stage 230 for the second embodiment. Some meters have displays that are sophisticated and allow for user prompting. Therefore, in each of the steps described below where the meter requires certain information in order to move to the next step, some meters may prompt the agent to make that step.

In a first step 340, the agent then puts the meter into a remote configuration mode by pressing a certain key sequence and entering a service access code. The key sequence is not obvious. This prevents customers and other unauthorized personnel from accidentally entering the configuration mode. The service access code is known to the agent and must be entered after completing the key sequence within a limited time interval that is checked by the microprocessor in combination with the clock. This further prevents customers and other unauthorized personnel from entering the configuration mode.

Upon entry of the predetermined key sequence and the agent access code, the meter enters the remote configuration mode by setting a mode register located in BAM (step 342). This prevents the meter from being used for printing purposes while being reconfigured.

The meter then displays the meter serial number, the meter BAM initialization date, and the old meter type number (old MTN) (step 344). The BAM initialization date is preferably a four digit number wherein the four digits YDDD express the date in which the meter was last initialized. The DDD stands for the number of days since December 31 and Y is the least significant digit of the year in which the meter was initialized. The old MTN is a number that defines the present feature set that the meter is presently configured to.

In the second embodiment, the meter also displays the Ascending Register amount or some other meter specific identifying information (step 344). The Ascending Register contains the amount of postage the meter has printed since the meter has been initialized.

The agent then enters the new MTN into the meter (step 346). This new number represents the set of features that the meter will have after reconfiguration. The agent must then press a selected key, such as the ENTER key, followed by the service access code within a limited time interval to indicate that the entered new MTN is correct and desired. If the entered new MTN is incorrect or not desired, the agent may let the timer expire or press another selected key such as a CLEAR key. The agent then enters the correct new MTN or exits the remote configuration mode. Once the correct new MTN is entered, the agent must press the selected key (i.e., ENTER) followed by the service access code within a limited time interval to indicate that it is the correct new MTN. The meter then stores the new MTN in BAM (step 348).

The meter then performs a series of tests to determine whether the meter is authorized to reconfigure to the new feature set represented by the new MTN. In the second embodiment, the meter also allows the agent to enter the fixed remote setting amount following the series of tests. The meter compares the new MTN with the old MTN to determine whether the remote setting feature will be among those features changed by the adoption of the new MTN (step 350). If there will be such a change (either enabling a disabled remote setting feature or disabling an enabled remote setting feature), the meter determines if the amount in the descending register is equal to zero (step 351). If the amount in the descending register is not equal to zero, the meter rejects the attempted re-configuration and notifies the agent (step 352). If the amount in the descending register is zero, the meter determines whether the new MTN enables the remote setting feature (step 353). If the new MTN enables the remote setting feature, the meter prompts the agent to enter the reset amount by which postage will be increased through use of the remote setting feature (step 358). If the new MTN does not enable the remote setting feature, i.e., the output of decision box 353 is "no", the meter determines if the installation flag has been set (step 354). A set installation flag indicates that the meter has been "installed" in accordance with the procedure described elsewhere herein, and is linked with the post office in the central data computer. The enablement status of the remote setting feature may not be changed in a meter so installed. If the installation flag is set, the proposed reconfiguration is rejected and the agent so notified (step 352). If the installation flag is not set, the meter displays the new MTN for agent confirmation (step 365).

If, however, the meter determines, at step 350, that the new MTN will not change the enablement status of the remote setting feature, the meter next determines whether this status is enabled (step 356). If it is, the meter determines if the installation flag is set (step 357). If the installation flag is not set, the meter permits the agent to change the reset amount as part of the re-configuration. The meter prompts the agent to enter the reset amount to be associated with the remote setting feature. If, however, the installation flag is set (step 357), or the new MTN does not enable the remote setting feature (step 356), the meter omits step 358 and displays the new MTN for agent confirmation (step 365). If the agent wants to start the process again with a new MTN, then the agent must press a selected key such as the CLEAR key (step 362). If the agent wants to continue, then the agent must press a selected key, such as the ENTER key, followed by the service access code or some other confirmation code (step 363). At this point, the meter puts the meter in a configuration pending mode by setting a meter configuration flag located in BAM (step 364). Once in the configuration pending mode, the meter must be reconfigured properly or else it will not return to the print mode. This prevents tampering with the reconfiguring of the meter. The meter remains in this mode even when the meter is turned off and then turned back on.

The meter then generates and displays an encrypted meter configuration request code (step 366). In the second embodiment, the configuration request code is partially based on the Ascending Register amount or some other meter identifying register, the old MTN, the new MTN, and the remote setting amount. The encryption process for the first and second embodiments is described in further detail below.

Figure 4:
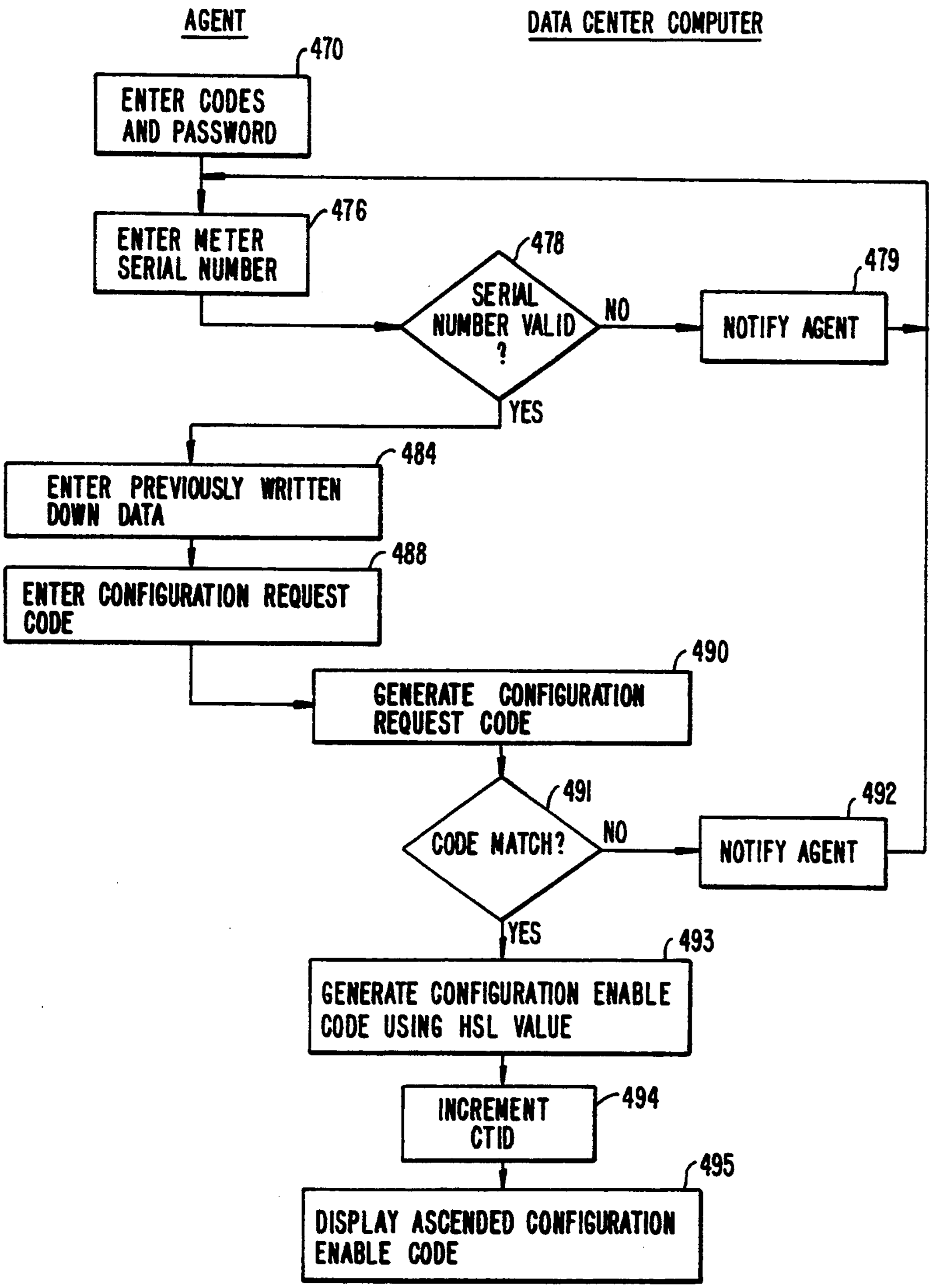
FIG. 4 is a detailed flowchart of the procedure for the agent to confirm the configuration request code with the data center computer.

FIG. 4 is a flowchart of stage 232 as shown in FIG. 2 for the first and second embodiments. The agent establishes communication with the data center computer over a standard telephone. In the first and second embodiments, the agent may communicate with the data center computer on a touch tone telephone by pressing the keys. Alternative embodiments may utilize a telephone communications device that includes a user or meter interface and a modem, or by voice recognition over a telephone.

The agent first enters various codes and a password to the computer (step 470). These include a transaction code (which describes that the agent is attempting to do a remote configuration for a meter) his employee number, and his authorization code (which is a password to the data center computer for that employee).

The agent then enters the meter serial number which was previously displayed by the meter but can also be found on the exterior of the meter (step 476). If the data center computer determines that the serial number is within a valid range (step 478), then the user may continue. Otherwise, the computer will notify the agent that the serial number is not within a valid range (step 479) and the agent must reenter the serial number or terminate the transaction.

The agent then enters data previously obtained in step 344 and written down above (step 484). In the first embodiment, this includes the BAM initialization date, the old MTN and the new MTN. In the second embodiment, this includes the BAM initialization date, the old MTN, the new MTN, the Ascending Register amount, and the remote setting amount.

The agent then enters the configuration request code from the meter (step 488). From the information above, the computer is also able to generate a configuration request code (step 490). The computer checks that its configuration request code matches the configuration request code generated by the meter (step 491). If they do not match, then the agent has improperly entered numbers, the meter has been improperly reconfigured, or some other error has occurred. If the codes do not match, then the agent is notified (step 492) and must repeat the above steps starting with entering the meter serial number (step 476) or terminate the transaction.

If the two codes match, then the computer generates an encrypted configuration enable code using the current high security length (HSL) value (step 493). The data center computer or other CTID counter then increments the CTID located within the computer (step 494). The HSL value is a level of security presently utilized by the meter and data center computer which affects the length of codes passed between the meter and the data center computer (see encryption routine discussion). The computer appends the HSL value to the configuration enable code and conveys the appended code to the agent (step 495).

Figure 5:
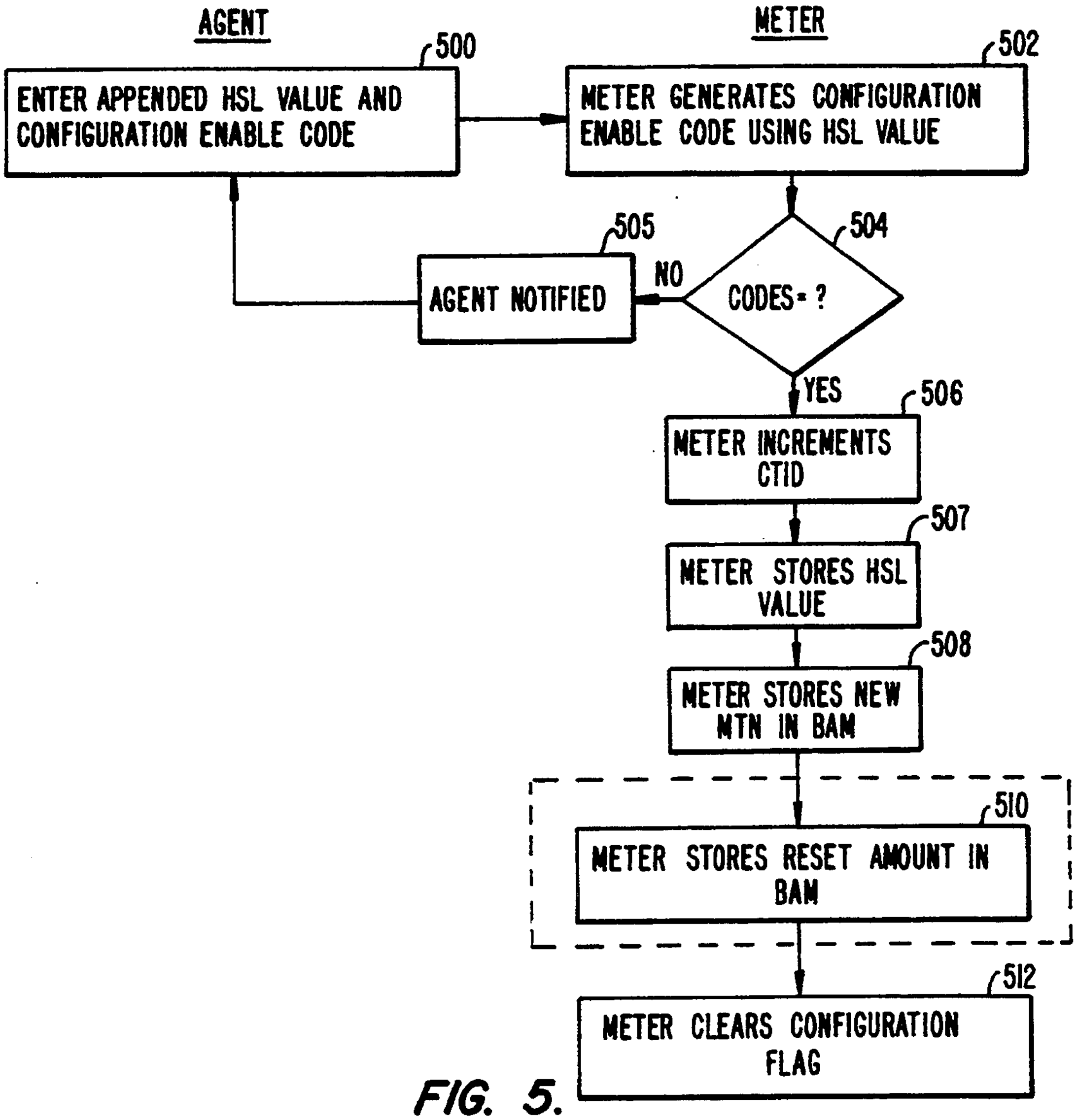
FIG. 5 is a detailed flowchart of the procedure for the agent to enter the configuration enable code into the meter.

FIG. 5 is a flowchart of stage 234 shown above in FIG. 2. The agent enters the appended computer generated HSL value and configuration enable code into the meter (step 500). The meter then generates its own configuration enable code using the appended HSL value (step 502) and compares that code with the entered configuration enable code (step 504). If the codes do not agree, then the agent is notified (step 505) and the agent reenters the computer generated code. If the configuration enable codes agree, then the meter knows that it is authorized to reconfigure. The meter then increments the CTID (step 506). The meter stores the new HSL value and the MTN in the HSL value location and the meter type number location in BAM (steps 507, 508). In the second embodiment, the meter also stores the five-digit remote setting amount in the remote setting amount location BAM if it was entered (step 510). The meter then clears the configuration flag (step 512), thereby allowing the meter to return from the configuration pending mode to the print mode.

Alternative Meter

Figure 6:
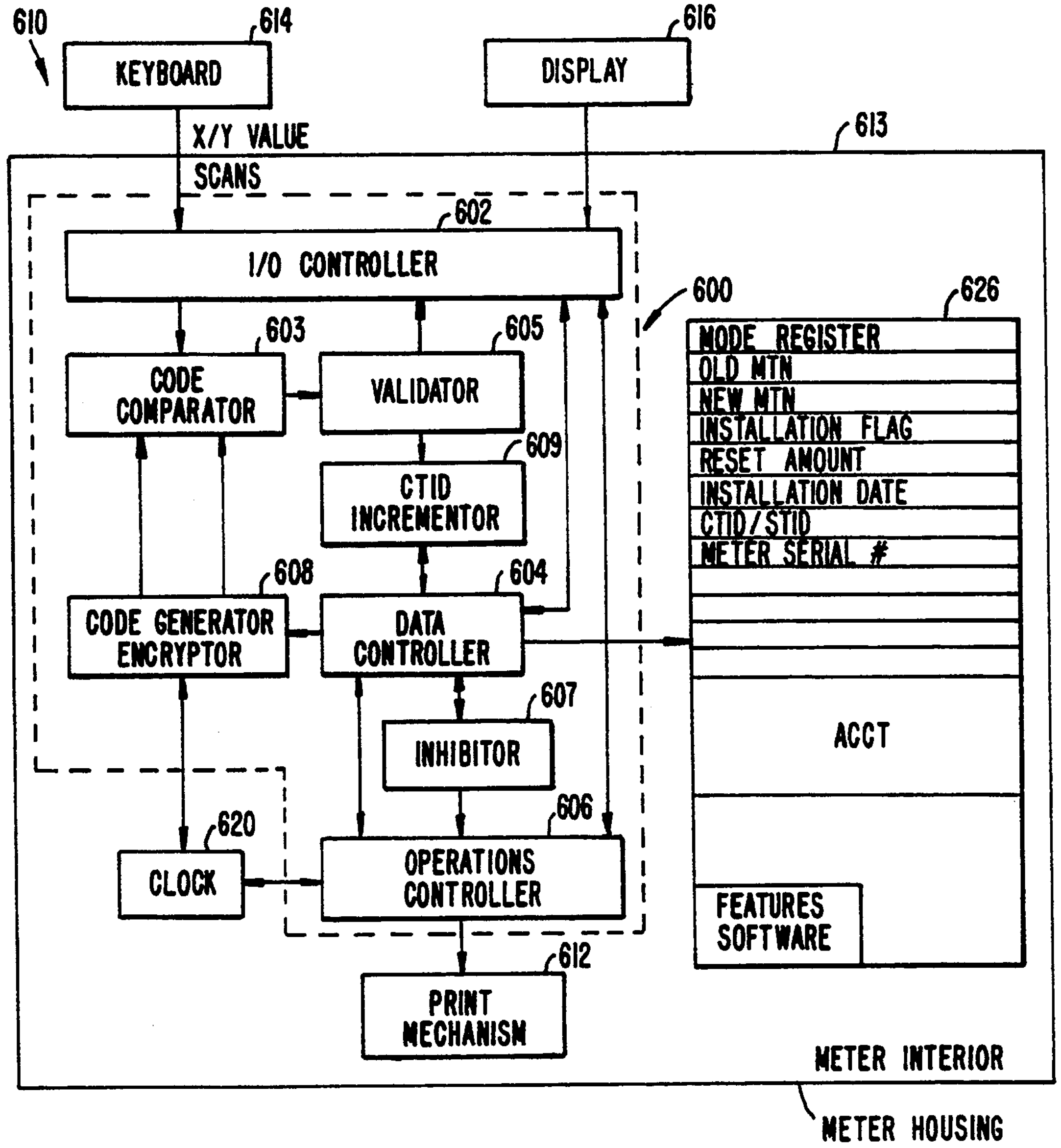
FIG. 6 is a block diagram of an alternative postage meter capable of being reconfigured in the field.

FIG. 6 is a block diagram of an alternative postage meter capable of being reconfigured in the field. Primed reference numerals are used for blocks that correspond to those in FIG. 1.

Meter 610 includes an external keyboard 614 and a display 616 to provide for user interface with the meter. A secure meter housing 613 encloses a print mechanism 612, clock 620, registers or flip-flops 626, and control circuitry 600. The control circuitry includes several controllers and other hard-wired circuits in lieu of a microprocessor as shown in FIG. 1.

The control circuitry includes an I/O controller 602 which performs as an interface between the rest of the control circuitry and the keyboard and display. A data controller 604 performs as an interface between the registers and the rest of the control circuitry. An operations controller 606 controls the operations of the meter by executing the feature software stored in the registers. The operations controller knows which features to execute by checking the new MTN register stored in BAM. An inhibitor 607 checks the mode register stored in the registers to determine whether operations of the meter should be inhibited.

A code generator/encryptor 608 continuously checks various registers in the registers and generates two encrypted codes based upon those registers. A code comparator 603 compares the generated codes with entered codes from the keyboard whenever such codes are entered (such as during a reconfiguration procedure). Upon a favorable comparison, the code comparator notifies a validator 605. The validator then gives a valid message through the I/O controller to the display and will instruct a CTID incrementor 609 to increment the CTID stored in the registers.

Figure 7:
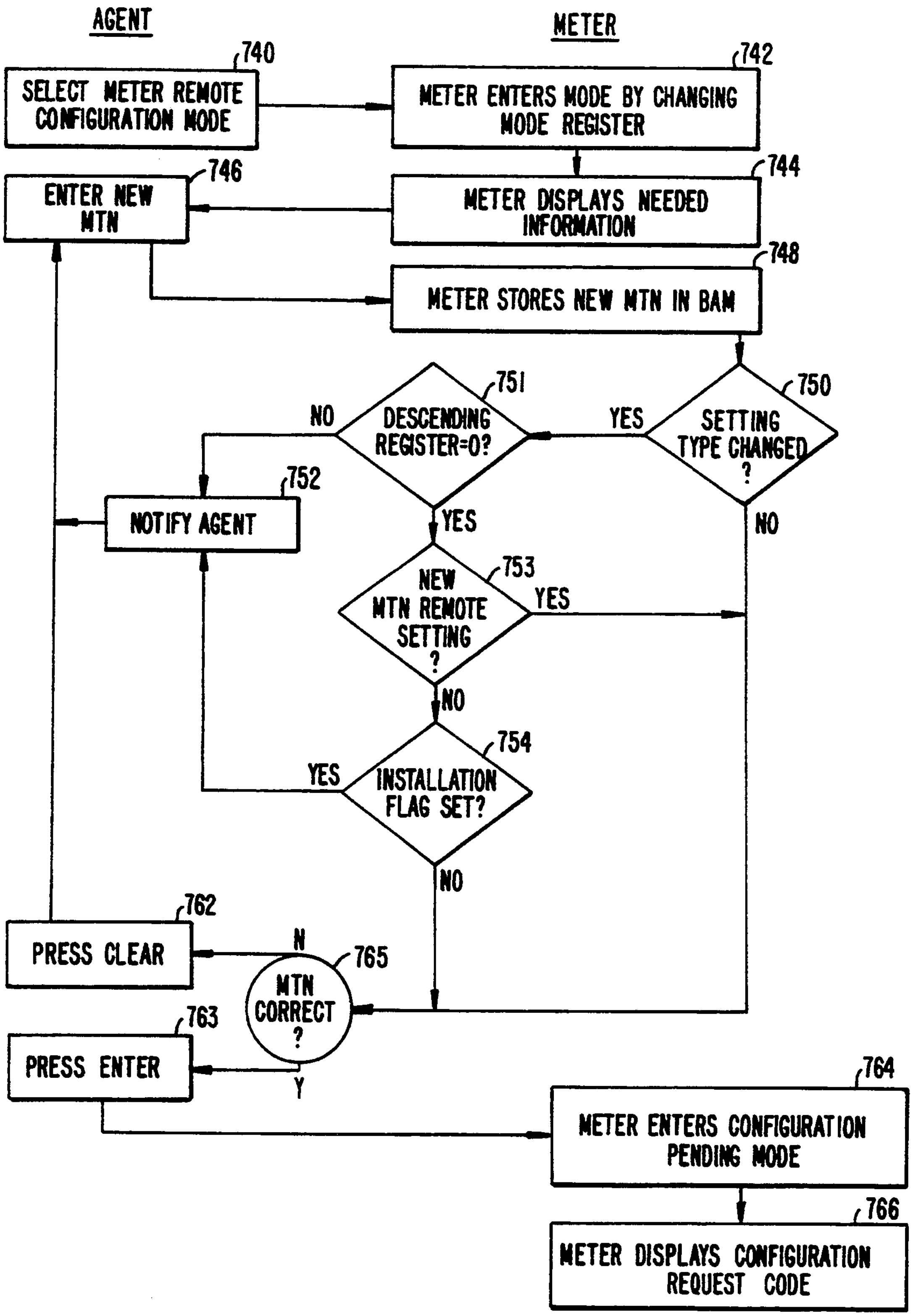
FIG. 7 is a detailed flowchart of the procedure for the agent to obtain a configuration request code generated by the meter in the first embodiment.

FIG. 7 is a detailed flowchart of stage 230 for the first embodiment. Some meters have displays that are sophisticated and allow for user prompting. Therefore, in each of the steps described below where the meter requires certain information in order to move to the next step, some meters may prompt the agent to make that step.

In a first step 740, the agent puts the meter into a remote configuration mode by pressing a certain key sequence and entering a service access code. The key sequence is not obvious. This prevents customers and other unauthorized personnel from accidentally entering the configuration mode. The service access code is known to the agent and must be entered after completing the key sequence within a limited time interval that is checked by the microprocessor in combination with the clock. This further prevents customers and other unauthorized personnel from entering the configuration mode.

Upon entry of the predetermined key sequence and the agent access code, the meter enters the remote configuration mode by setting a mode register located in BAM (step 742). This prevents the meter from being used for printing purposes while being reconfigured.

The meter then displays the meter serial number, the meter BAM initialization date, and the old meter type number (old MTN) (step 744). The BAM initialization date is preferably a four digit number wherein the four digits YDDD express the date in which the meter was last initialized. The DDD stands for the number of days since December 31 and Y is the least significant digit of the year in which the meter was initialized. The old MTN is a number that defines the present feature set that the meter is presently configured to.

The agent then enters the new MTN into the meter (step 746). This new number represents the set of features that the meter will have after reconfiguration. The agent must then press a selected key, such as the ENTER key, followed by the service access code within a limited time interval to indicate that the entered new MTN is correct and desired. If the entered new MTN is incorrect or not desired, the agent may let the timer expire or press another selected key such as a CLEAR key. The agent then enters the correct new MTN or exits the remote configuration mode. Once the correct new MTN is entered, the agent must press the selected key (i.e., ENTER) followed by the service access code within a limited time interval to indicate that it is the correct new MTN. The meter then stores the new MTN in BAM (step 748). The meter then performs a series of tests to determine whether the meter is authorized to reconfigure to the new feature set represented by the new MTN.

The meter then compares the new MTN with the old MTN to determine whether the remote setting feature will be among those features changed by the adoption of the new MTN (step 750). If there will be such a change (either enabling a disabled remote setting feature or disabling an enabled remote setting feature), the meter determines if the amount in the descending register is equal to zero (step 751). If the amount in the descending register is not equal to zero, the meter rejects the attempted reconfiguration and notifies the agent (step 752). If the amount in the descending register is zero, the meter determines whether the new MTN enables the remote setting feature (step 753). If the new MTN enables the remote setting feature, the meter displays the new MTN for agent confirmation (step 765). If the new MTN does not enable the remote setting feature, i.e., the output of decision box 753 is "no", the meter determines if the installation flag has been set (step 754). A set installation flag indicates that the meter has been "installed" in accordance with the procedures below, and is linked with the post office in the central data computer. The enablement status of the remote setting feature may not be changed in a meter so installed. If the installation flag is set, the proposed reconfiguration is rejected and the agent so notified (step 752). If the installation flag is not set, the meter displays the new MTN for agent confirmation (step 765).

If, however, the meter determines, at step 750, that the new MTN will not change the enablement status of the remote setting feature, it is unnecessary to determine if the meter is installed (since in this embodiment there is no reset amount to be changed). The meter then displays the new MTN for agent confirmation (step 765). If the agent wants to start the process again with a new MTN, then the agent must press a selected key such as the CLEAR key (step 762). If the agent wants to continue, then the agent must press a selected key, such as the ENTER key, followed by the service access code or some other confirmation code (step 763). At this point, the meter puts the meter in a configuration pending mode by setting a meter configuration flag located in BAM (step 764). Once in the configuration pending mode, the meter must be reconfigured properly or else it will not return to the print mode. This prevents tampering with the reconfiguring of the meter. The meter remains in this mode even when the meter is turned off and then turned back on.

The meter then generates and displays an encrypted meter configuration request code (step 766). The configuration request code is partially based on the CTID, the old MTN, and the new MTN.

Encryption Technique

In order to perform the above procedure in a secure manner and to confirm certain data, the configuration request code and the configuration enable code are generated by an encryption routine, stored both in the meter ROM and in the data center computer. The encryption routine is a nonlinear algorithm that generates a number that is apparently random to an outside person. The encryption routine is performed by an encryption program in combination with a permanent encryption table. In the first and second embodiments, the encryption routine uses a 16-digit (or 64-bit) key and a 16-digit input number.

In the first embodiment, the configuration request code is generated by the encryption routine performed on the CTID as the key and a combination of the old MTN and the new MTN as the input number. In the second embodiment, the key is composed of the meter serial number and the BAM initialization date and the input number is composed of the old MTN, the Ascending Register amount and the new MTN, and the remote setting amount.

In the first embodiment, the configuration enable code is generated by the encryption routine performed on the CTID as the key and a combination of the old MTN, new MTN, and HSL value as the input number. In the second embodiment, the configuration enable code is generated by the encryption routine performed on the CTID as the key and a combination of the meter serial number and the HSL value as the input number.

The CTID is a 16-digit number that is stored in BAM. The initial value of the CTID is obtained by performing an algorithm upon the BAM initialization date in combination with the meter serial number. The BAM initialization date is used to prevent starting with the same CTID every time the meter is initialized. The algorithm is not stored in the meter for security reasons. The initial CTID is stored in BAM during the initialization process at the factory. After the meter is reconfigured, the CTID is incremented by a nonlinear algorithm within the meter.

The codes generated by the encryption routine are 16-digits long. The lower digits of the codes are then communicated to the agent by the meter or the data center computer. The number of lower digits that are communicated is determined by the HSL value.

Variable Length Security Codes

An algorithm is used to generate an apparently random code with multiple digits. However, only a selected number of digits (usually the lower digits) of this code need to be used in most applications. The number of digits needed depends upon the level of security needed. It is preferred to use as few digits as possible to decrease the number of keystrokes that must be entered, thereby increasing convenience and decreasing the potential for error.

As a result, a variable has been created which defines the overall level of security required by the meter or data center computer. This variable is called the high security length (HSL) value.

Each code generated by the meter or data center computer has a variable length of digits used depending upon the HSL value. That is, if the HSL value is 1, then the configuration request code should have 6 digits. If the HSL value is higher, then the configuration request code should be longer. Other codes may have different lengths for a given HSL value, but each code will increase or decrease in length if the HSL value is increased or decreased.

This predetermined relationship between code length and the HSL value allows the meter manufacturer to increase or decrease security for the meter without having to recover and initialize each meter. Changes in the HSL value are communicated to the meter when performing a remote meter configuration.

In an alternative embodiment, multiple security variables may be used to vary the lengths of individual or groups of codes without affecting the length of the remaining codes.

It can be seen that the present invention provides a secure and efficient technique for allowing meters to be reconfigured in the field. The meter customer has the option of selecting features while the meter company is spared the burden of maintaining a huge inventory that would otherwise be necessary.

While the above is a complete description of specific embodiments of the invention in part I, various modifications, alternative constructions, and equivalents may be used. For example, the electronics of the configurable meter may be structured differently. Additionally, instead of using the tones on the telephone, a direct connection via modem can be used. Furthermore, the encryption key used to generate the request codes could be composed of a meter cycle counter instead of the meter serial number. Other security measures may be implemented such as requiring periodic inspection of the meter.

Therefore, the above description and illustration should not be taken as limiting the scope of the present invention, which is defined by the appended claims.

II. REMOTE METER I/O CONFIGURATION

Meter and External Device Overview

Figure 8:
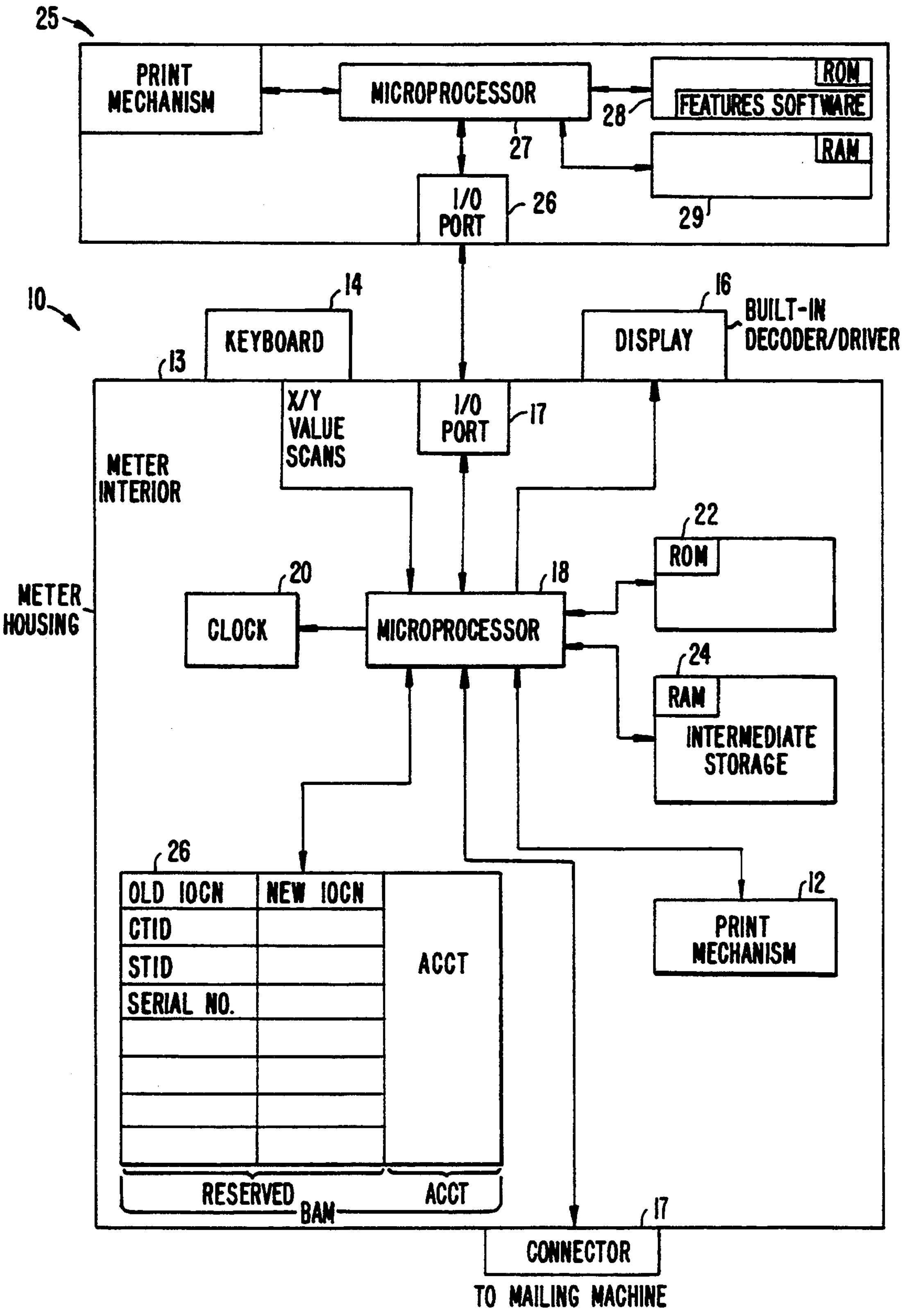
FIG. 8 is a block diagram of a preferred postage meter capable of being reconfigured in the field and an external device in communication with the meter.

FIG. 8 is a block diagram of a preferred postage meter capable of being reconfigured in the field and an external device in communication with the meter. Meter 810 includes a print mechanism 812, accounting registers, and control electronics, all enclosed within a secure meter housing 813. A keyboard 814 and a display 816 provide the user interface. An I/O port 817 provides a communications channel with external devices. The control electronics includes a digital microprocessor 818 which controls the operation of the meter, including the basic functions of printing and accounting for postage. The microprocessor is connected to a clock 820, a read only memory (ROM) 822, a random access memory (RAM) 824, and a battery augmented memory (BAM) 826.

ROM 822 is primarily used for storing nonvolatile information such as software and data/function tables necessary to run the microprocessor. The ROM can only be changed at the factory. RAM 824 is used for intermediate storage of variables and other data during meter operation. BAM 826 is primarily used to store accounting information that must be kept when the meter is powered down. The BAM is also used for storing certain flags and other information that is necessary to the functioning of the microprocessor. Such information includes meter identifying data such as the meter serial number and BAM initialization date, and a number of parameters relevant to the remote configuration of the meter.

The meter can communicate with various external devices such as printers, scales, mailing machines via connector 831 and computers via computer interfaces. Printer 825 is shown communicating with the meter via I/O port 833 and the meter I/O port. Microprocessor 827 controls the operation of the printer. ROM 828 is primarily used for storing nonvolatile information such as software necessary to run the printer microprocessor. RAM 829 is used for intermediate storage of variables and other data during printer operation.

Whether a feature or feature set in the printer is enabled, is controlled by an I/O configuration number (IOCN) representing the feature set enabled. In a first embodiment the IOCN is stored in meter BAM and is read by the printer microprocessor during printer power-up. The printer microprocessor then stores the IOCN in RAM. When the user requests a feature (such as the printing of an accounting report) the printer then checks the IOCN stored in RAM to see whether the feature is available. Upon receiving an affirmative reply, the printer obtains the necessary data from the meter and prints the desired report. In a second embodiment, the printer does not read the IOCN during power-up. The printer checks the IOCN stored in the meter when the user requests a feature.

Meter Relationship the Data Center Computer

In the first and second embodiments, the meter is configured to a standard I/O feature set before leaving the factory. Because the I/O feature set is known, the meter and the external devices can be functional before the meter is registered on the data center computer. In alternative embodiments, the meter can be in a disabled state for security reasons until it has been I/O reconfigured or otherwise reconfigured (see part I. "REMOTE METER CONFIGURATION") a first time.

During the I/O reconfiguration process, the meter's serial number, present I/O configuration, and other information specific to the meter (which were already stored in the meter's memory during an initialization process at the factory) are entered on the data center computer. The meter and the computer are then to generate identical encrypted codes by using the same encryption routine and input numbers. The encrypted codes help the data center computer maintain control over the external device feature set of each meter.

The input numbers used by the meter and the computer to generate the encrypted codes are the configuration transaction identifier ("CTID") and the setting transaction identifier ("STID"). They are both specific to the meter and dependent upon the meter serial number, they may also be incremented after each use. The CTID is normally used for reconfiguring the meter and external device functions and the STID is normally used for remote setting the meter postage. Separate numbers are used for the separate procedures in order to maximize securely and minimize complexity caused by interdependence. The encryption routine using the CTID is described in greater detail below.

Meter I/O Configuration Method

Figure 9:
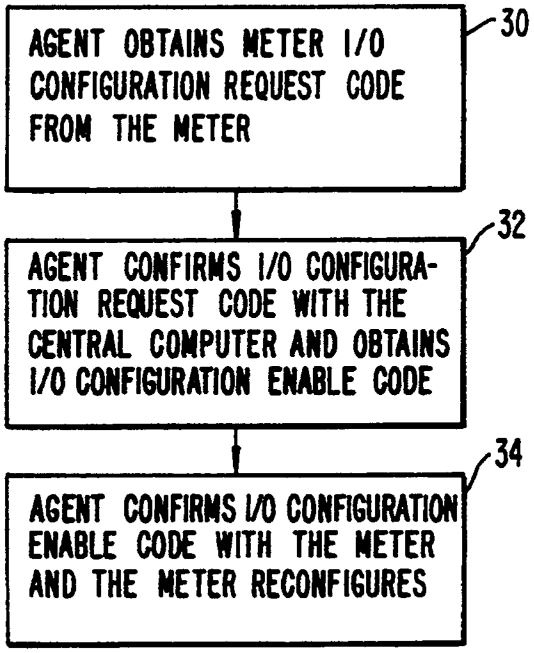
FIG. 9 is a high level flowchart of the process for reconfiguring the postage meter IOCN.

FIG. 9 is a high level flowchart of the process necessary for reconfiguring the postage meter by an agent at a customer's site or at the agent's technical service area. In a first stage 930, the agent obtains an I/O configuration request code calculated by the meter. This I/O configuration request code is essentially a password to a data center computer, and is based upon a combination of factors, the combination of which only the data center computer would know. In a second stage 932, the agent confirms the I/O configuration request code with the data center computer. Upon confirmation from the data center computer, the data center computer provides an I/O configuration enable code back to the agent. The I/O configuration enable code is essentially a password from the data center computer to the meter stating that it is permissible to reconfigure to the desired options. In a third stage 934, the agent enters the I/O configuration enable code into the meter. The meter confirms the I/O configuration enable code and reconfigures itself.

Figure 10:
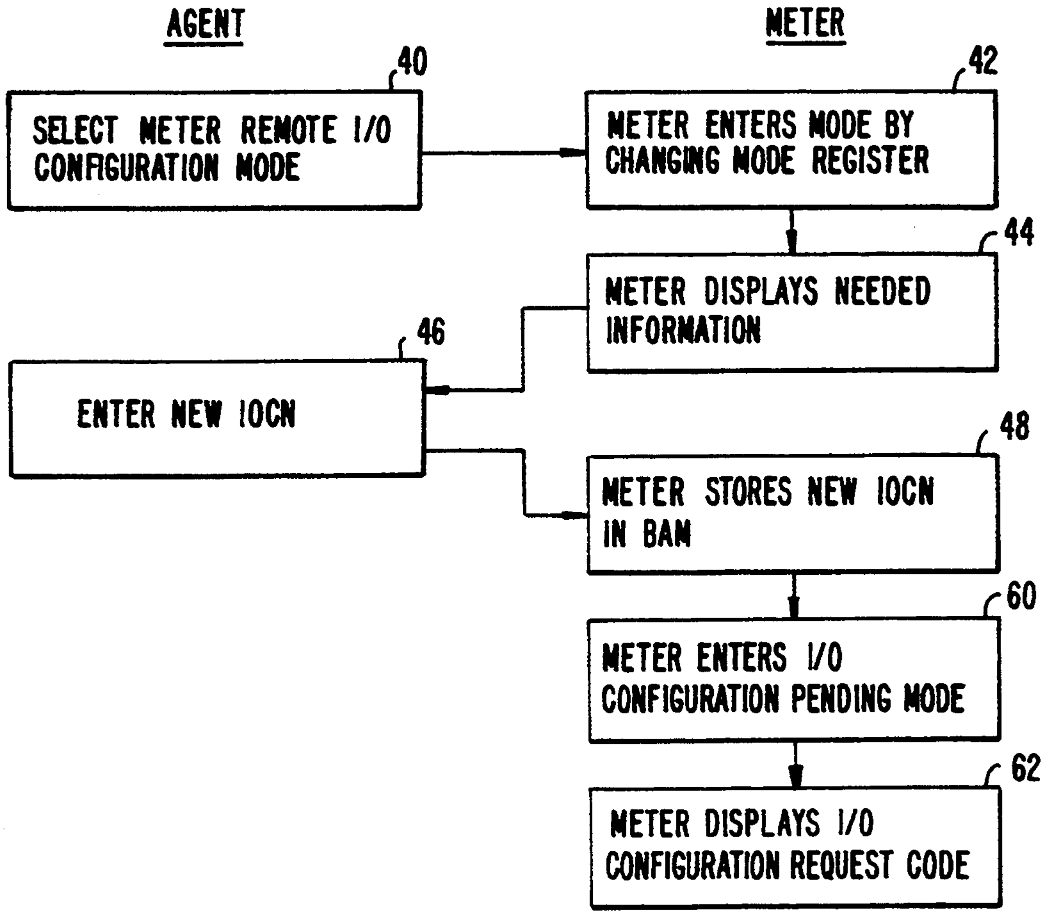
FIG. 10 is a detailed flowchart of the procedure for the agent to obtain an I/O configuration request code calculated by the meter.

FIG. 10 is a detailed flowchart of stage 930 for the first and second embodiments. Some meters have displays that are sophisticated and allow for user prompting. Therefore, in each of the steps described below where the meter requires certain information in order to move to the next step, some meters may prompt the agent to make that step.

In a first step 1040, the agent puts the meter into a remote I/O configuration mode by pressing a certain key sequence and entering a service access code. The key sequence is not obvious. This prevents customers and other unauthorized personnel from accidentally entering the I/O configuration mode. The service access code is known to the agent and must be entered after completing the key sequence within a limited time interval that is scheduled by the microprocessor in continuation with the clock. This further prevents customers and other unauthorized personnel from entering the I/O configuration mode.

Upon entry of the predetermined key sequence and the service access code,the meter enters the remote I/O configuration mode by setting a mode register located in BAM (step 1042). This prevents the meter from being used for printing purposes while being reconfigured.

In the first embodiment, the meter then displays the meter serial number and the meter BAM initialization date (step 1044). The BAM initialization date is preferably a low digit number wherein the four digits YDDD express the date in which the meter was last initialized. The DDD stands for the number of days since December 31 and Y is the least significant digit of the year in which the meter was initialized.

In the second embodiment, the meter displays the above numbers and the Ascending Register amount or some other meter specific identifying information. The Ascending Register contains the amount of postage the meter has printed since the meter has been initialized.

The agent then enters the new IOCN into the meter (step 1046). This new number represents the features that the external devices will have after I/O reconfiguration. The agent must then press a selected key, such as the ENTER key, followed by the service access code within a limited time interval to indicate that the entered new IOCN is correct and desired. If the entered new IOCN is incorrect or not desired, the agent may let the timer expire or press another selected key such as a CLEAR key. The agent then enters the correct new IOCN or exits the remote I/O configuration mode. Once the correct new IOCN is entered, the agent must press the selected key (i.e., ENTER) followed by the service access code within a limited time interval to indicate that it is the correct new IOCN. The meter then stores the new IOCN in BAM (step 1048).

The meter then puts itself into an I/O configuration pending mode by setting a meter configuration flag located in BAM (step 1060). Once in the I/O configuration pending mode, the meter must be reconfigured properly or else it will not return to the print mode. This prevents unauthorized tampering with the reconfiguring of the meter. The meter remains in this mode even when the meter is turned off and then turned back on.

The meter then generates and displays an encrypted meter I/O configuration request code (step 1062). In the first embodiment, the I/O configuration request code is practically based on the CTID and the new IOCN. In the second embodiment, the I/O configuration request code is partially based on the Ascending register amount, the CTID, and the new IOCN. The encryption process for doing so is described in further detail below.

Figure 11:
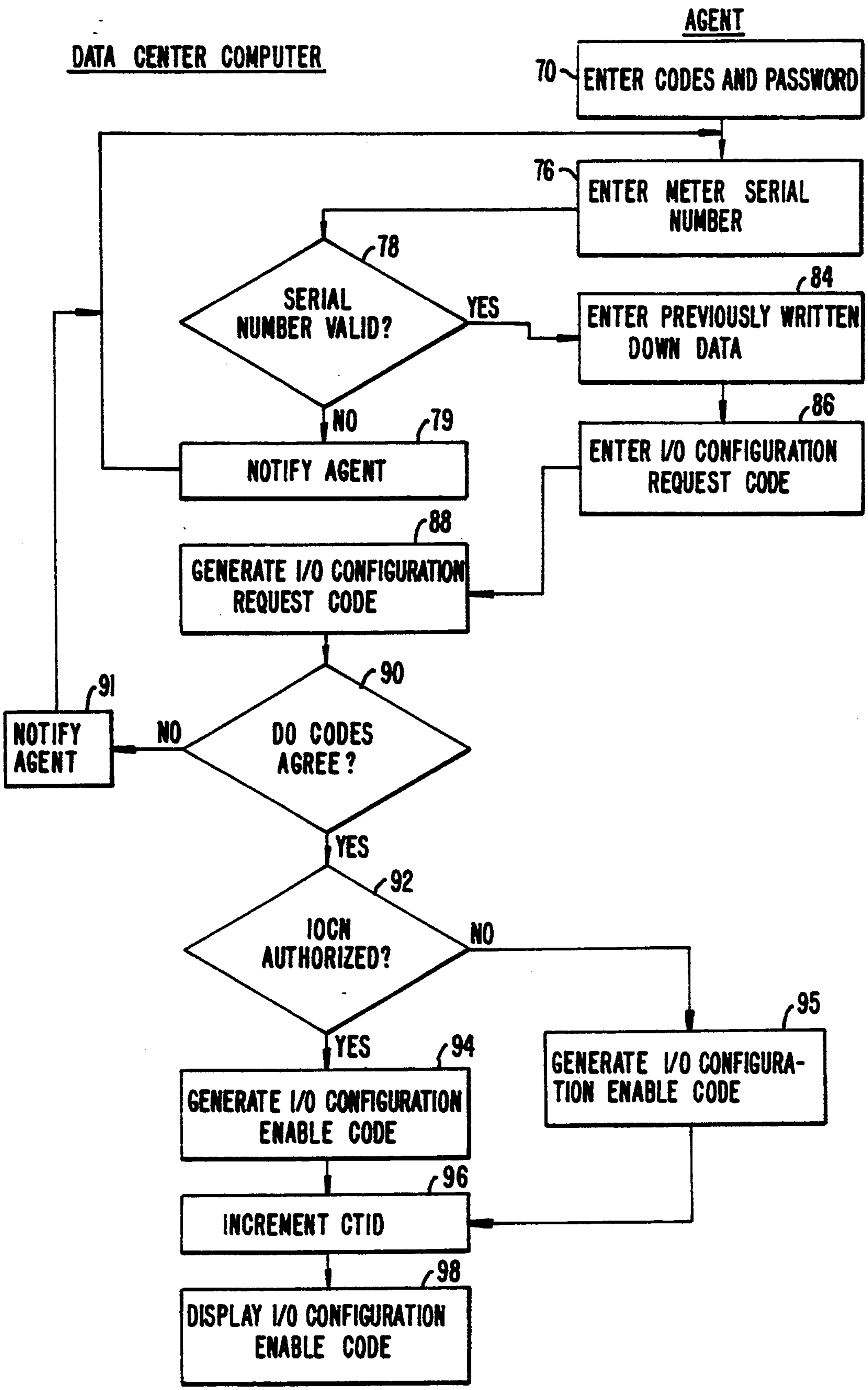
FIG. 11 is a detailed flowchart of the procedure for the agent to confirm the I/O configuration request code with the data center computer.

FIG. 11 is a flowchart of stage 932 as shown in FIG. 9 for the first and second embodiments. The agent establishes communication with the data center computer over a standard telephone. In a first and second embodiments, the agent may communicate with the data center computer on a touchtone telephone by pressing the keys. Alternative embodiments may utilize a telephone communications device that includes a user or meter interface and a modem, or by voice recognition over a telephone.

The agent first enters various codes and a password to the computer (step 1170). These include a transaction code (which describes that the agent is attempting to do a remote I/O configuration for a meter). The agent's employee number, and the agent's authorization code (which is a password to the data center computer for that employee).

The agent then enters the meter serial number which was previously displayed by the meter but can also be found on the exterior of the meter (step 1176). If the data center computer determines that the serial number is within a valid range (step 1178), then the user may continue to step 1184. Otherwise, the computer will notify the agent that the serial number is not within a valid range (step 1179) and the agent must reenter the serial number or terminate the transaction.

Assuming that the serial number is valid (yes at step 1178), the agent then enters data previously obtained and written down (step 1184). In the first embodiment, this includes the BAM initialization date and the new IOCN. In the second embodiment, this includes the BAM initialization date, the new IOCN, and the Ascending Register amount.

The agent then enters the I/O configuration request code (step 1186) which was also obtained above from the meter (in step 1162). From this information, the computer is able to generate an I/O configuration request code (step 1188). The computer checks that its generated I/O configuration request code matches the I/O configuration request code generated by the meter (step 1190). If they do not match, then the agent has improperly entered numbers, the meter has been improperly reconfigured, or some other error has occurred. The agent is then notified (step 1191) and must repeat the above steps starting with entering the meter serial number (step 1176) or terminate the transaction.

If the two codes match, then the computer determines whether the requested IOCN is authorized for the customer (step 1192). If it is authorized, then the computer generates an encrypted I/O configuration enable code using a current high security length ("HSL") value and a status code stating that the IOCN is authorized (step 1194) and increments the CTID (step 1196). The HSL value is a level of security presently utilized by the meter and data center computer which affects the length of codes passed between the meter and the data center computer (see the discussion of the encryption technique elsewhere herein). If the IOCN is not authorized, then the computer generates an encrypted I/O configuration enable code also, using the current HSL value and a status code stating that the IOCN is not authorized (step 1195). The encryption process for doing so is described in further detail below. The data center computer then increments a counter called the configuration transaction identifier (CTID) located within the computer (step 1196). The computer then displays the generated I/O configuration enable code (step 1198).

Figure 12:
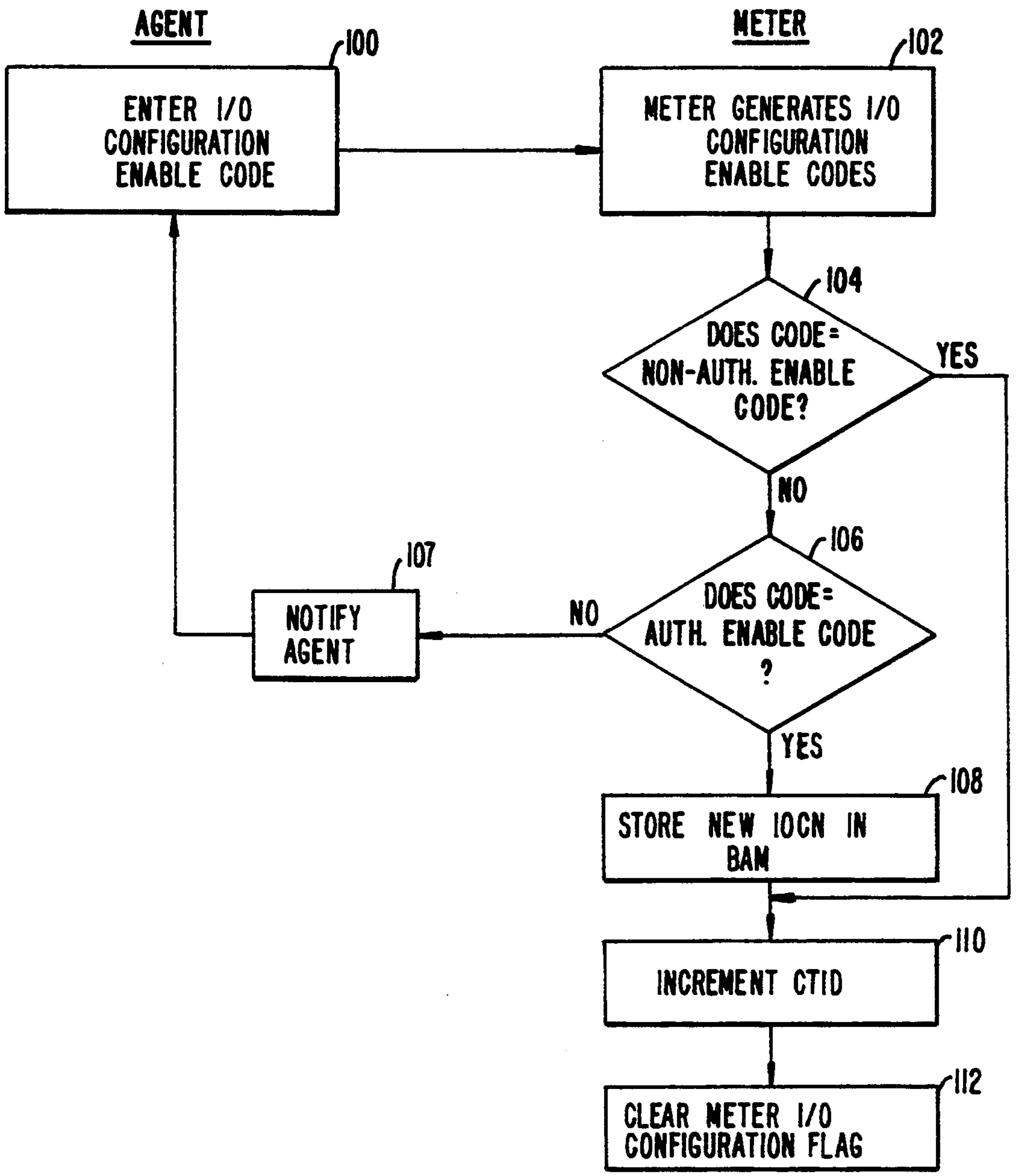
FIG. 12 is a detailed flowchart of the procedure for the agent to enter the I/O configuration enable code into the meter.

FIG. 12 is a flow chart of stage 934 shown above in FIG. 9. The agent enters the appended computer generated HSL value and I/O configuration enable code into the meter (step 1200). The meter then generates two I/O configuration enable codes (step 1202) using the appended HSL value, one which indicated the IOCN is authorized, the other indicating that the IOCN is not authorized. If the computer generated enable code does not equal either code (steps 1204 and 1206), then the agent is notified (step 1207) and is asked to reenter the computer generated I/O configuration enable code. If the computer generated I/O configuration enable code equals the meter generated enable code indicating that the IOCN is authorized, then the new IOCN replaces the old IOCN in BAM (step 1208). If the computer generated enable code equals either of the meter generated enable codes, then the CTID is incremented (step 1210) and the meter I/O configuration pending flag is cleared (step 1212), thereby allowing the meter to return from the I/O configuration pending mode to the print mode.

Encryption Technique

In order to perform the above procedure in a secure manner and to confirm certain data, the I/O configuration request code and the configuration enable code are generated by an encryption routine, stored both in the meter ROM and the data center computer. The encryption routine is a nonlinear algorithm that generates a number that is apparently random to an outside person. The encryption routine is performed by an encryption program in combination with a permanent encryption table. In the first and second embodiments, the encryption routine uses a 16-digit (or 64-bit) key and a 16-digit input number.

In the first embodiment, the I/O configuration request code is generated by the encryption routine performed on the CTID as the key and the IOCN as the input number. In the second embodiment, the key is composed of the Ascending Register amount and the IOCN as the input number.

In the first embodiment, the I/O configuration enable code is generated by the encryption routine performed on the CTID as the key and a combination of the meter serial number, status code, and HSL value as the input number. In the second embodiment, the I/O configuration enable code is generated by the encryption routine performed on the CTID as the key and a combination of the Ascending Register amount, meter serial number, and status code as the input number.

The CTID is a 16-digit number that is stored in BAM. The initial value of the CTID is obtained by performing an algorithm upon the BAM initialization date in combination with the meter serial number. The BAM initialization date is used to prevent starting with the same CTID every time the meter is initialized. The algorithm is not stored in the meter for security reasons. The initial CTID is stored in BAM during the initialization process at the factory. After the meter is I/O reconfigured, the CTID is incremented by a nonlinear algorithm within the meter.

The codes generated by the encryption routine are 16 digits long. The lower digits of the codes are then communicated to the agent by the meter or the data center computer. The number of lower digits that are communicated is determined by the HSL value.

Installation Procedure

This procedure is performed by an agent when installing a remote setting meter at a customer's site.

Prior to this procedure, the meter must have been reconfigured (see part I. "REMOTE METER CONFIGURATION") at least once since being initialized in order to establish a first link between the meter and the data center computer. In addition, the meter must be configured to include the remote setting feature. Furthermore, the meter cannot print postage until it has been installed.

This procedure establishes a second link between the meter, the customer, and a lease on the data center computer for accounting, billing, and security purposes. This procedure also ensures that the meter has been logged into service at the post office.

Meter at the Post Office

After reconfiguring the meter, the agent or the customer takes the meter to the Post Office to register it. Once registered, the Post Office Clerk inserts a special key in the side of the meter enabling it to be installed.

Agent at the Customer Site with the Meter

Upon arriving at a customer site with the Post Office enabled meter to be installed, the agent presses a selected key sequence to put the meter in an installation mode. The meter then displays in sequence several numbers which the agent should write down for later use in this procedure. The meter first displays the amount stored in two of the accounting registers, the Descending Register and the Control Register. The Descending Register contains the amount of postage the meter presently has for printing postage. The Ascending Register contains the amount of postage the meter has been credited since the meter left the factory. The Control Register contains the sum of the Descending and Ascending Register amounts. The meter then displays an Installation Registration Code ("IRC"). The IRC is also an encrypted number dependent upon meter specific data and may include the STID. The meter then prompts for an encrypted Installation Setting Code ("ISC") which is dependent upon the STID.

Agent with the Data Center Computer

The agent then contacts the data center computer and enters a standard installation request code, thereby notifying the computer that the agent is in the process of performing an installation procedure. The agent then enters the agent's number, the agent's authorization code, the number of the customer lease for the meter, the serial number of the meter to be installed and other similar numbers. The computer tests the serial number for validity. If the serial number is invalid, the agent should recheck and reenter the serial number or terminate the transaction.

If the serial number is valid, the agent enters the Descending Register amount, the Control Register amount, and the IRC. The computer then internally generates the IRC and compares it with the meter generated IRC. If the codes are unequal for any reason, then the agent should repeat the above process beginning with entering the serial number of the meter to be installed.

The data center computer generates and communicates the ISC, which the meter has prompted for, and increments the STID. The computer then internally flags that the meter is installed at the customer site.

Agent at the Meter

The agent returns to the meter and enters the computer generated ISC. The meter then internally generates an ISC and compares it with the entered installation code. If the codes are not equal, the meter will not accept the code. The agent may then obtain the current ISC from the data center computer again. Unlimited retries are permitted. If the codes are equal, the meter then increments the STID and sets an installation flag in BAM thereby allowing the meter to be remotely set and to print postage.

It can be seen that the present invention provides a secure and efficient technique for allowing meters to be reconfigured in the field. The meter customer has the option of selecting features or feature sets while the meter company is spared the burden of maintaining a huge inventory that would otherwise be necessary or using a less secure system.

While the above is a complete description of specific embodiments of the invention in part II, various modifications, alternative constructions, and equivalents may be used. For example, the electronics of the configurable meter may be structured differently. Additionally, instead of using the tones on the telephone, a direct connection via modem can be used. Furthermore, the encryption key used to generate the meter request codes could be composed of a meter cycle counter instead of the Ascending Register Amount. Other security measures may be implemented such as requiring periodic inspection of the meter.

III. EMERGENCY POST OFFICE SETTING FOR REMOTE SETTING METER

Meter Overview: Structure

FIG. 1 is a block diagram of a preferred postage meter 110 that can be remotely set in the field by the customer. Meter 110 includes a print mechanism 112, accounting registers, and control electronics, all enclosed within a secure meter housing 113. A keyboard 114 and a display 116 provide the user interface. A connector 117 provides an electrical connection with a mailing machine for control of the printing process. The control electronics includes a digital microprocessor 118 which controls the operation of the meter, including the basic functions of printing and accounting for postage, and optional features such as department accounting and remote setting. The microprocessor is connected to a clock 120, a read only memory (ROM) 122, a random access memory (RAM) 124, and a battery augmented memory (BAM) 126.

ROM 122 is primarily used for storing nonvolatile information such as software and data/function tables necessary to run the microprocessor. The ROM can only be changed at the factory. RAM 124 is used for intermediate storage of variables and other data during meter operation. BAM 126 is primarily used to store accounting information that must be kept when the meter is powered down. The BAM is also used for storing certain flags and other information that is necessary to the functioning of the microprocessor. Such information includes meter identifying data such as the meter serial number and BAM initialization date, and a number of parameters relevant to the remote configuration of the meter.

Meter Relationship with the Data Center Computer

Prior to being able to perform an emergency remote setting procedure, the meter must have been capable of being remotely set. However, the meter cannot be remotely set until it has been "installed" at a customer site by an Installation Procedure which links the meter, the customer, and the customer lease on the data center computer. This linkage may be securely removed by a Withdrawal Procedure or an Exchange Procedure.

The withdrawal procedure is performed by an agent when withdrawing a remote setting meter from a customer site. This procedure removes the second link between the meter, the customer and the lease on the data center computer. In addition, this procedure prevents the meter from being remotely set. Furthermore, this procedure allows the meter to be reconfigured to change the fixed reset amount, or to a non-remote setting meter, installed at another customer site, or returned to the factory.

Agent with the Data Center Computer

The agent contacts the data center computer and enters a standard withdrawal request code, thereby notifying the central computer that the agent is in the process of performing a withdrawal procedure. The agent then enters the agents number, the agent's authorization code, and the serial number of the meter and other data to be withdrawn. The data center computer tests the serial number for validity. If the serial number is invalid, the agent should recheck and reenter the serial number. If the serial number continues to be invalid, then the meter is not properly registered on the central computer and the agent should contact the factory for further instructions.

If the serial number is valid, the agent enters a reason code. The reason code is a alphanumeric value which represents the reason why the meter is being withdrawn. The data center computer then internally generates an encrypted Withdrawal Setting Code ("WSC"). The data center computer then flags the meter as being withdrawn and increments the meter STID.

Agent at the Meter

If the meter is not functional, the agent returns the meter to the factory. If the meter is functioning then the agent presses a selected key sequence to put the meter in a withdrawal mode. The agent then enters the computer generated WSC into the meter. The meter then internally generates the WSC and compares it with the computer generated WSC. If the codes are not equal, the meter will display an error message and the agent reenters the computer generated WSC. Unlimited retries are permitted. If the codes are equal, the meter then increments the STID and clears the installation flag in BAM.

Meter at the Post Office

After withdrawing the meter, the agent or customer takes the meter to the Post Office to close the registration previously performed in the Installation Procedure. Once the registration is closed, the Post Office Clerk inserts a special key in the side of the meter thereby completing the Withdrawal Procedure.

The exchange procedure is performed by an agent when replacing a meter at a customer's site with another meter. This procedure is merely a combination of the withdrawal of the old meter and installation of the new meter at the customer site. Each of the steps for the meters are the same as described in the Installation and Withdrawal Procedures except the agent is able to perform the procedures with only a single communication with the computer.

Two input numbers used by the meter and the data center computer to generate encrypted codes are the configuration transaction identifier ("CTID") and the setting transaction identifier ("STID"). They are both specific to the meter and dependent upon the meter serial number. They may also be incremented after each use. The CTID is normally used for reconfiguring the meter functions and emergency remote setting and the STID is normally used for remote setting the meter postage. Separate numbers are used for separate procedures in order to maximize security and minimize complexity caused by interdependence. The encryption routine is described in greater detail below.

Emergency Setting Method

Figure 13A:
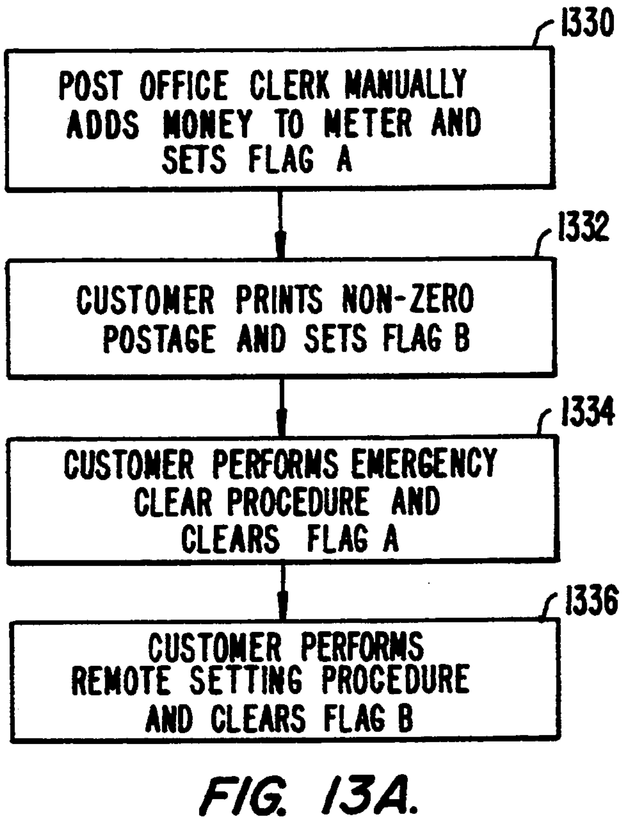
FIG. 13*a* is high level flowchart of the process for manually adding postage to the postage meter in an emergency without the remote setting code and subsequently clearing the meter for future remote settings and emergency settings.

FIG. 13*a* is a high level flow chart of the process necessary for manually adding postage to the postage meter in an emergency without the remote setting code and subsequently clearing the meter for future remote settings and emergency settings.

In a first stage 1330, the customer takes the meter to the Post Office where a Post Office Clerk manually adds postage to the meter without the remote setting code. The first stage causes the meter to set a first flag (called flag A) within the meter. The meter can now be used to print postage, but it cannot be remotely set nor can the Post Office manually reset the meter again until later in the method. In a second stage 1332, the customer prints some non-zero postage in order to set a second flag (called flag B) within the meter. As before, the meter can still be used to print postage but it cannot be remotely set nor can the Post Office manually set the meter again until later in the method. In a third stage 1334, the customer then performs an emergency clear procedure in order to notify the data center computer of the manual setting performed by the Post Office. This stage causes the meter to clear flag A, thereby allowing the meter to be remotely set and to print postage, but not to be manually set by the Post Office. Due to security concerns, the meter must be remotely set at least once between manual settings. In a fourth stage 1336, the customer performs a remote setting procedure, thereby causing the meter to clear flag B. The meter may now set remotely or manually.

Figure 13B:
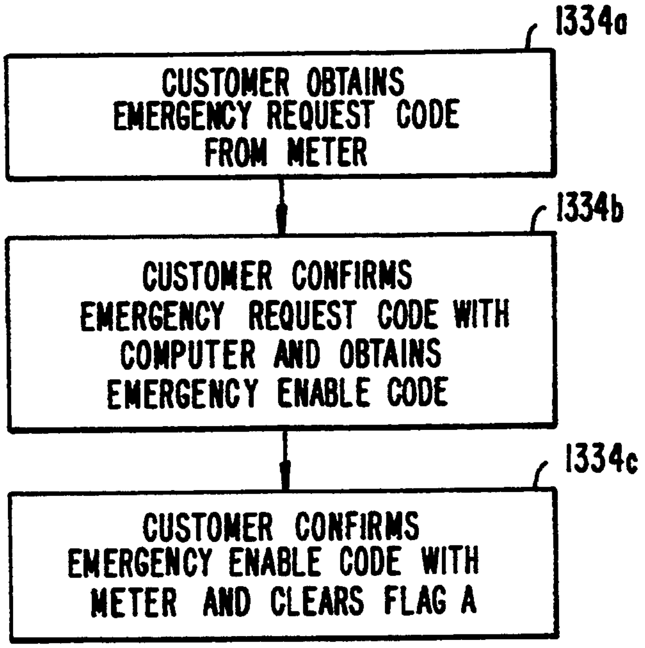
FIG. 13*b* is a high level flowchart of the process for notifying the data center computer of the manual setting.

FIG. 13*b* is a high level flowchart of the process for notifying the data center computer of the manual setting as shown in stage 1334 of FIG. 13*a*. In first substage 1334*a*, the customer obtains an emergency request code generated by the meter. This emergency request code is essentially a password to the data center computer, and is based on a combination of factors, the combination of which only the data center computer would know. In a second substage 1334*b*, the customer confirms the emergency request code with the data center computer. Upon configuration from the computer, the computer provides an emergency enable code back to the customer. The emergency enable code is essentially a password from the data center computer to the meter stating that it is permissible to be remotely set by the emergency remote setting amount. In a third substage 1334*c*, the customer enters the emergency enable code into the meter. The meter confirms the emergency enable code with an internally generated emergency enable code and thereby clears flag A.

Figure 14:
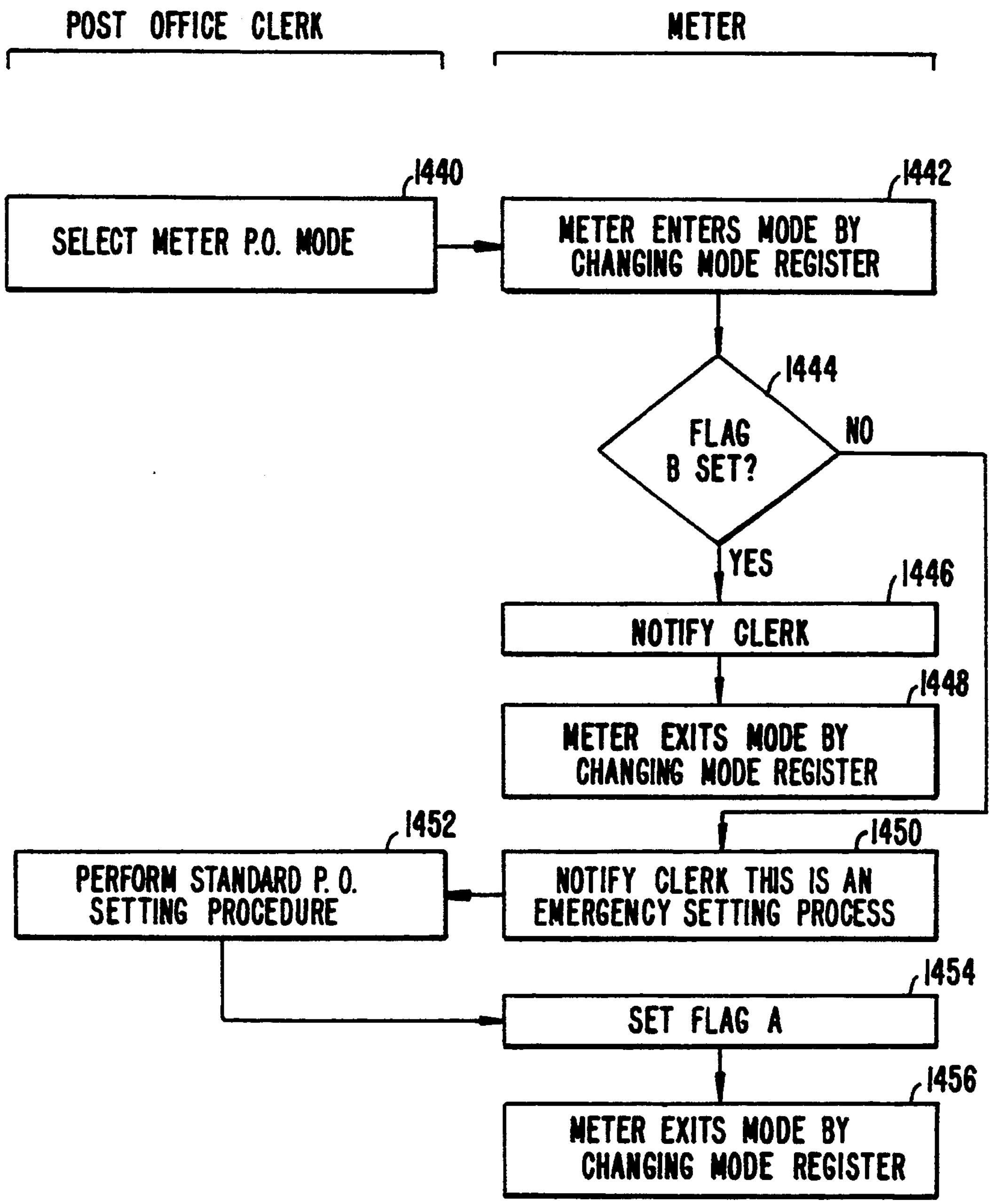
FIG. 14 is a detailed flow chart of the procedure for the Post Office Clerk to manually add postage to the meter.

FIG. 14 is a detailed flow chart of stage 1330 as shown in FIG. 13*a*. Some meters have displays that are sophisticated and allow for user prompting. Therefore, in each of the steps described below, where the meter requires certain information in order to move to the next step, some meters may prompt the user to make that step.

In a first step 1440, the customer takes the meter to a Post Office where a Post Office Clerk puts the meter into a Post Office mode by pressing a certain key sequence. This prevents customers and other unauthorized personnel from accidentally entering the Post Office mode. The meter then enters the Post Office mode by setting a mode register located in BAM (step 1442). This prevents the meter from being used for printing purposes while performing this procedure.

The meter then checks whether a flag B is already set. Due to a security requirement that only one manual setting procedure be performed between remote setting procedures, flag B is set every time the manual setting procedure is completed and non-zero postage is printed and is cleared when an emergency clear procedure and a remote setting procedure is performed. If flag B is set, then the meter displays an error message to the Post Office Clerk (step 1446), then exits the Post Office mode (step 1448).

If flag B is not set, then the meter notifies the Post Office Clerk that the meter is a remote setting meter and that this procedure is an emergency setting procedure (step 1450). If the meter were not remote setting, then the meter would be in a standard manual setting mode. Once notified, the Post Office Clerk then performs a manual setting procedure (step 1452). The manual setting procedure includes entering a setting amount (which would be an emergency setting amount under the present circumstances) and using a Post Office key, thereby authorizing the meter to print the setting amount of postage. The customer is then given a form 3603 by the Post Office Clerk as a receipt. The meter then sets flag A signifying that the meter is enabled has been manually set by the Post Office. The meter then exits the Post Office mode by setting the mode register (step 1456). The meter can now be used to print postage. The meter can subsequently be returned to the Post Office for modification of the emergency setting amount before printing any non-zero postage by repeating the above procedure.

Figure 15:
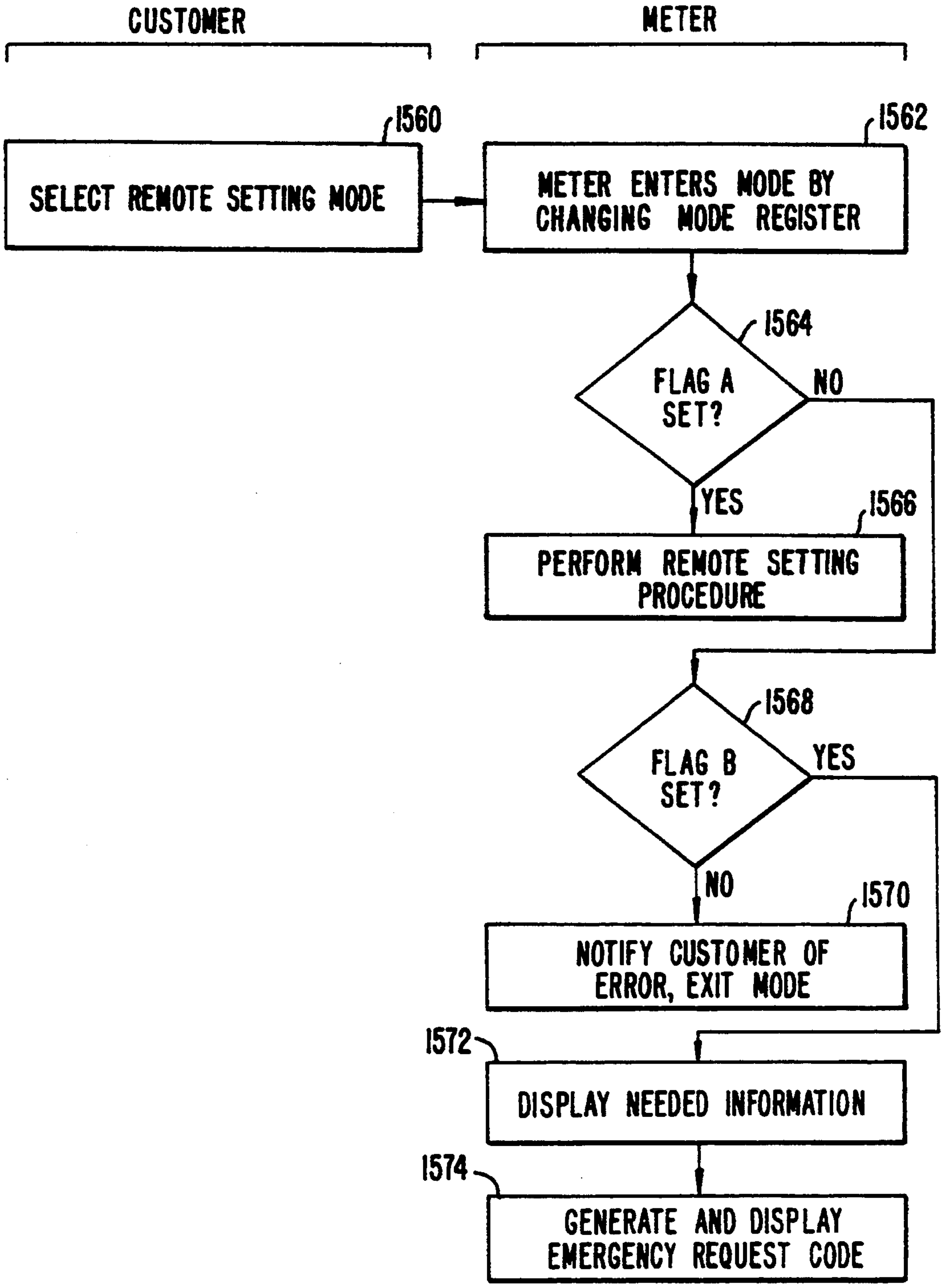
FIG. 15 is a detailed flowchart of the procedure for the customer to obtain an emergency request code generated by the meter.

FIG. 15 is a detailed flow chart of substage 1334*a* as shown in FIG. 13*b*.

In a first step 1560, the customer puts the meter into a remote setting mode by pressing a certain key sequence. This prevents the customer from accidentally entering the remote setting mode. Upon entry of the key sequence, the meter enters the remote setting mode by setting the mode register in BAM (step 1562). This prevents the meter from being used from printing postage while being remotely set.

In step 1564, the meter tests whether flag A is already set (meaning that an emergency setting procedure has not been performed since the last remote setting procedure). If flag A is set, then the meter allows the customer to perform the standard remote setting procedure (step 1566) which would clear flag A as in stage 1336 at FIG. 13*a*.

If flag A is not set, then in step 1568 the meter tests whether flag B is set (meaning that the Post Office has manually set the meter and that the meter has printed non-zero postage). If flag B is not set, then the customer is notified that non-zero postage is needed to be printed and the meter exits the mode (step 1570).

If flag B is set, then the meter then displays information needed later in the method (step 1572). This includes the Ascending Register amount, the Descending Register amount, the emergency resetting amount and the emergency request code. The Ascending Register contains the amount of postage the meter has printed since the meter has been initialized. The Descending Register contains the amount of postage the meter is presently authorized to print. The meter then generates and displays an emergency request code (step 1574). The emergency request code is a code generated by the meter which is partially based on the Ascending Register amount, and the STID. The encryption process is described in greater detail below.

Figure 16:
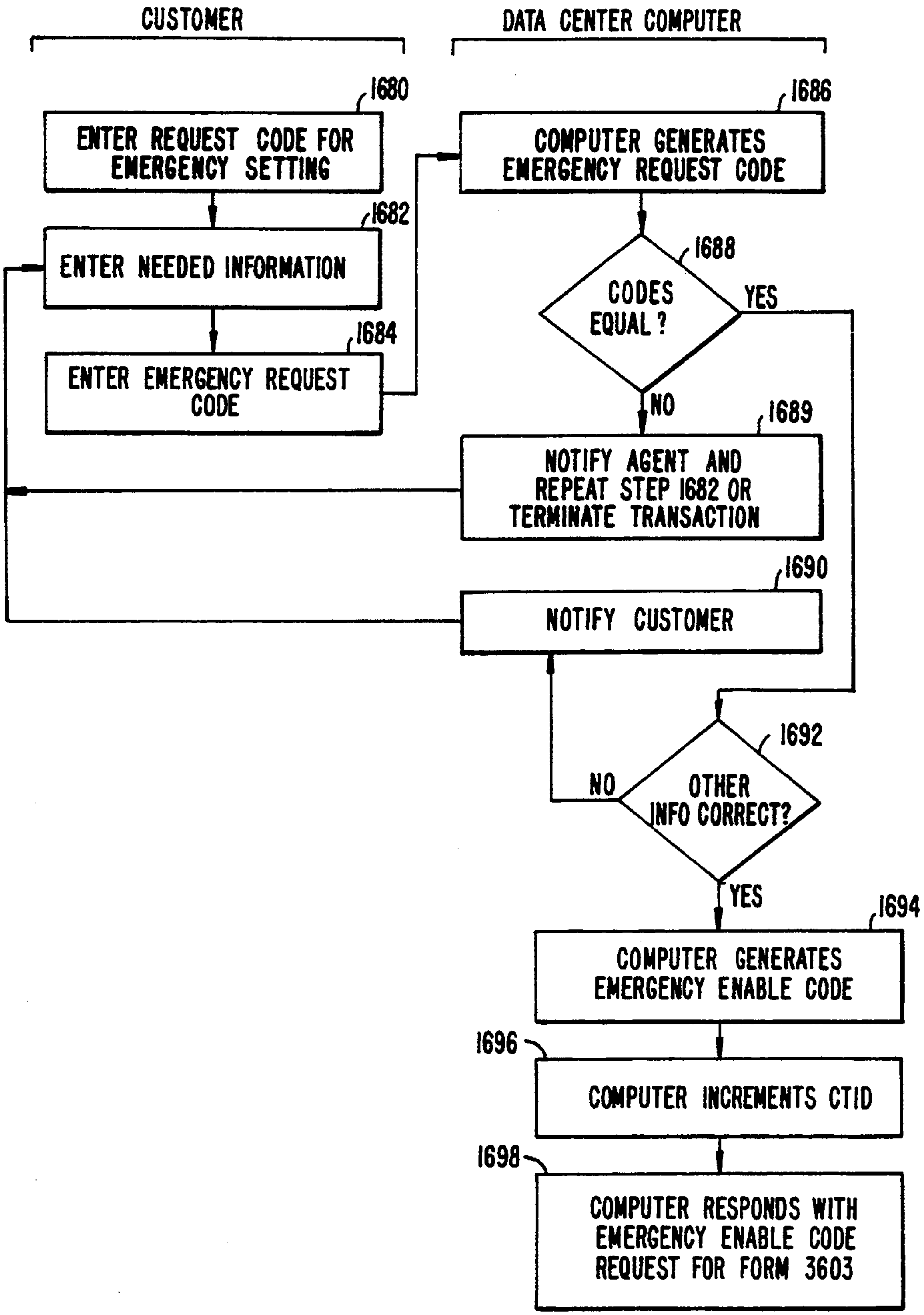
FIG. 16 is a detailed flowchart of the procedure for the customer to confirm the emergency request code with the data center computer.

FIG. 16 is a detailed flowchart of substage 1334*b* as shown in FIG. 13*b*. The customer establishes communication with the data center computer over a standard telephone. The customer may communicate with the data center computer on a touch tone telephone by pressing the keys. Alternative embodiments may utilize a telephone communications device that includes a user or meter interface and a modem, or by voice recognition over a telephone.

The customer first enters a request code (which describes that the agent is attempting to do an emergency clear procedure for a meter) and a password to the computer (step 1680).

The customer enters the meter serial number which can also be found on the exterior of the meter. The customer then enters the customer account number, the Ascending Register amount, the manual setting amount, and the Descending Register amount, some of which were previously obtained and written down above (step 1682). The agent then enters the emergency request code from the meter (step 1684). From the information above, the computer is also able to generate an emergency request code (step 1686). The computer checks that its emergency request code matches the emergency request code generated by the meter (step 1688). If they do not match, then the computer checks emergency request codes dependent upon prior STIDs. This enables the computer to determine how many remote settings are outstanding. If the codes still do not match, then the agent has improperly entered numbers or some other error has occurred. If the codes do not match, then the agent is notified (step 1690) and must repeat the above steps starting with entering the meter serial number (step 1682) or terminate the transaction. The computer then checks the other information entered by the customer to see if it agrees with what is already stored on the computer (step 1692). If the information does not match then some error has occurred so the customer is notified (step 1690) as above.

If the two codes match and the other information is accurate, then the computer generates an encrypted emergency enable code using the CTID and the meter serial number (step 1694). The encryption process is described in greater detail below. The data center computer then increments the CTID located within the computer (step 1696).

The computer then communicates the encoupled emergency enable code to the customer along with a request for the form 3603 to be mailed to the meter company from the customer to validate the transaction.

Figure 17:
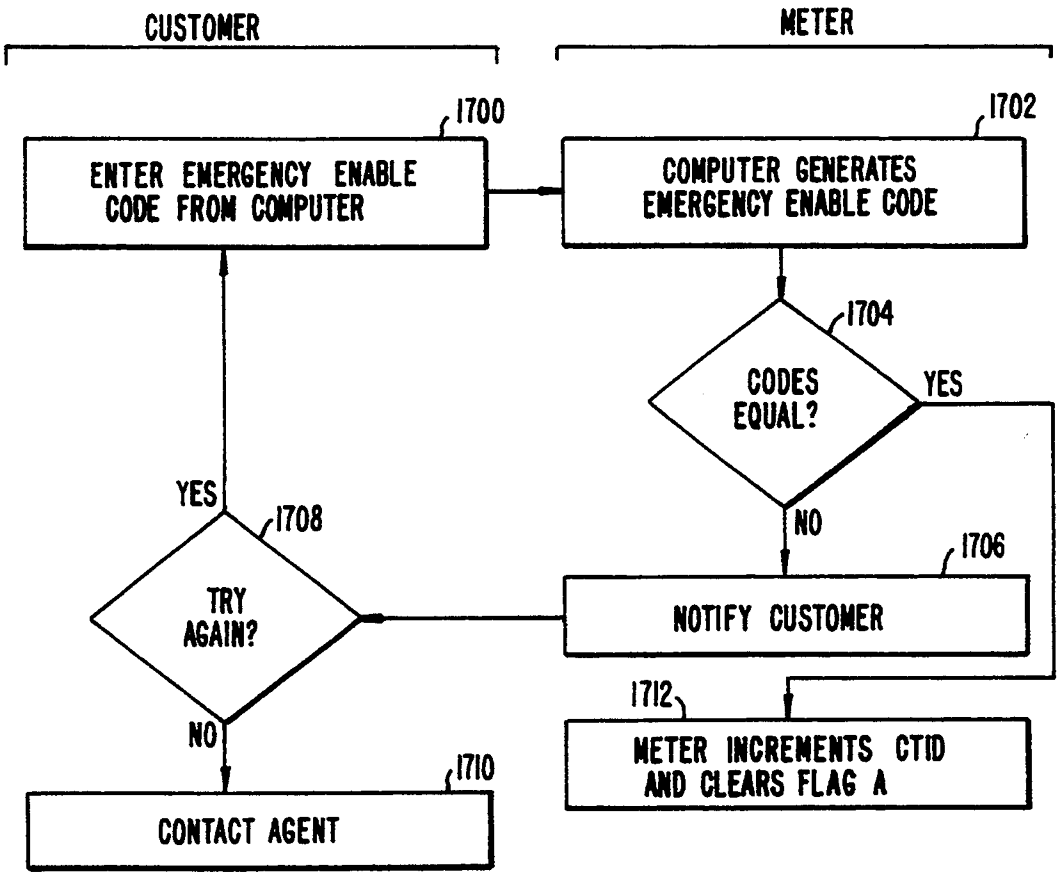
FIG. 17 is a detailed flowchart of the procedure for the customer to enter the emergency enable code into the meter.
Figure 21A:
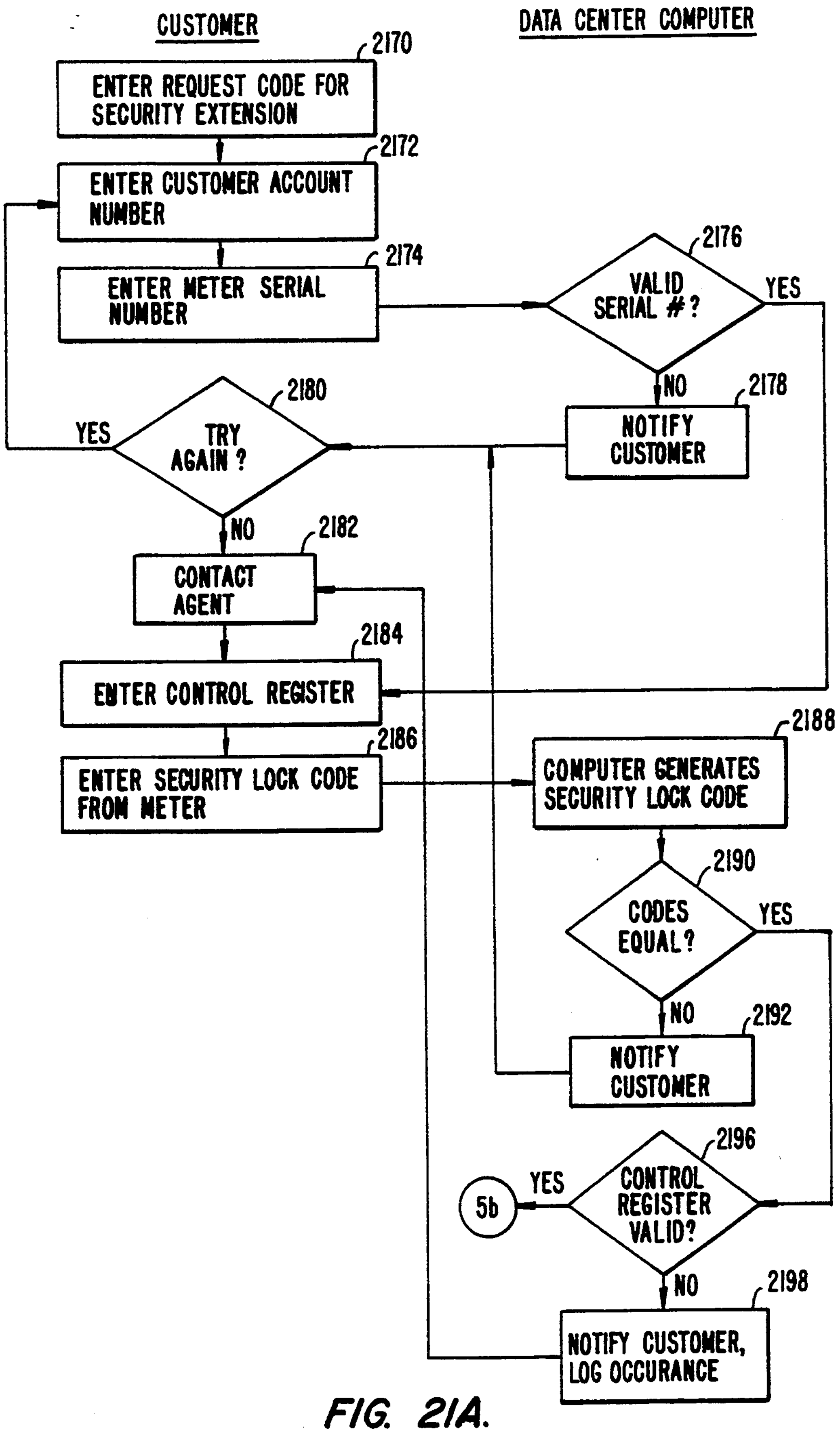
FIGS. 21*a* and 21*b* are detailed flowcharts of the procedure for the customer to confirm the security lock code with the data center computer.
Figure 21B:
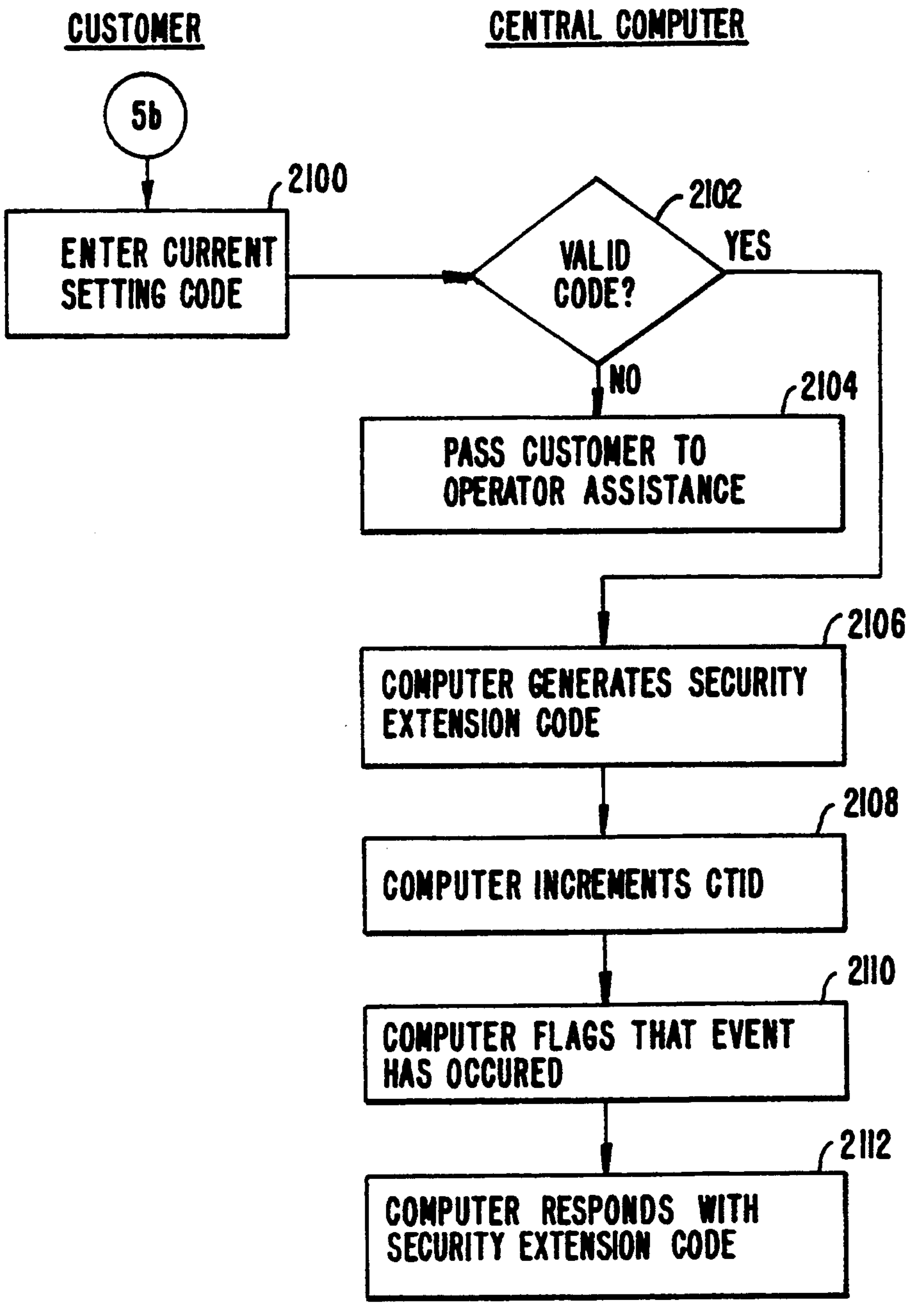

FIG. 17 is a detailed flowchart of substage 1334*c* shown above in FIG. 13*b*. The customer enters the computer generated emergency enable code into the meter (step 1700). The meter then generates its own emergency enable code (step 1702) and compares that code with the entered emergency enable code (step 1704). If the codes do not agree, then the customer is notified (step 1706). The customer may reenter the computer generated code or call an agent at the meter company for help. If the configuration enable codes agree, then the meter knows that it is authorized to set the emergency setting amount. The meter then increments the CTID and sets flag B.

Encryption Technique

In order to perform the above procedure in a secure manner and to confirm certain data, the emergency request code and the emergency enable code are generated by an encryption routine, stored both in the meter ROM and in the data center computer. The encryption routine is a nonlinear algorithm that generates a number that is apparently random to an outside person. The encryption routine is performed by an encryption program in combination with a permanent encryption table. In the preferred embodiment, the encryption routine uses a 16-digit (or 64-bit) key and a 16-digit input number.

The emergency request code is generated by the encryption routine performed on the STID as the key and the Ascending Register amount as the input number. The configuration enable code is generated by the encryption routine performed on the CTID as the key and the meter serial number as the input number.

The CTID and STID are 16-digit numbers that are stored in BAM. The initial value of the CTID and STID are obtained by performing an algorithm upon the BAM initialization date in combination with the meter serial number. The BAM initialization date is used to prevent starting with the same CTID and STID every time the meter is initialized. The algorithm is not stored in the meter for security reasons. The initial CTID and STID are stored in BAM during the initialization process at the factory. After the computer has been notified of the manual setting procedure, the CTID is incremented by a nonlinear algorithm within the meter and the computer.

The codes generated by the encryption routine are 16 digits long. The lower digits of the codes are then communicated to the agent by the meter or the data center computer. The number of lower digits that are communicated is determined by the HSL value.

An algorithm is used to generate an apparently random code with multiple digits. However, only a selected number of digits (usually the lower digits) of this code needs to be used in most applications. The number of digits needed depends upon the level of security needed. It is preferred to use as few digits as possible to decrease the number of keystrokes that must be entered, thereby increasing convenience and decreasing the potential for error.

As a result, a variable has been created which defines the overall level of security required by the meter or data center computer. This variable is called the high security length ("HSL") value.

Each code generated by the meter or data center computer has a variable length of digits used depending upon the HSL value. That is, if the HSL value is 1, then the emergency request code should have 6 digits. If the HSL value is higher, then the emergency request code should be longer. Other codes may have different lengths for a given HSL value, but each code will increase or decrease in length if the HSL value is increased or decreased.

This predetermined relationship between code length and the HSL value allows the meter manufacturer to increase or decrease security for the meter without having to recover and initialize each meter. Changes in the HSL value are communicated to the meter when performing a remote meter configuration (see part I. "REMOTE METER CONFIGURATION").

In an alternative embodiment, multiple security variables may be used to vary the lengths of individual or groups of codes without affecting the length of the remaining codes.

It can be seen that the present invention provides a secure and efficient technique for allowing meters to be remotely set in an emergency by the customer.

While the above is a complete description of specific embodiments of the invention in part III, various modifications, alternative constructions, and equivalents may be used. For example, the electronics of the configurable meter may be structured differently. Additionally, instead of using the tones on the telephone, a direct connection via modem can be used. Furthermore, the encryption routine could use other meter identifying information to generate the emergency request and enable codes such as the CTID or STID in both codes. For example, the encryption key used to generate the request codes could be composed of a meter cycle counter. Other security measures may be implemented such as reviewing periodic inspection of the meter.

IV. DETECTION OF ENTRY 0F INVALID REMOTE SETTING CODE

Meter Overview: Structure

FIG. 1 is a block diagram of a preferred postage meter 110 that can be remotely set in the field by the customer. Meter 110 includes a print mechanism 112, accounting registers, and control electronics, all enclosed within a secure meter housing 113. A keyboard 114 and a display 116 provide the user interface. A connector 117 provides an electrical connection with a mailing machine for control of the printing process. The control electronics includes a digital microprocessor 118 which controls the operation of the meter, including the basic functions of printing and accounting for postage, and optional features such as department accounting and remote setting. The microprocessor is connected to a clock 120, a read only memory (ROM) 122, a random access memory (RAM) 124, and a battery augmented memory (BAM) 126.

ROM 122 is primarily used for storing non-volatile information such as software and data/function tables necessary to run the microprocessor. The ROM can only be changed at the factory. RAM 124 is used for intermediate storage of variables and other data during meter operation. BAM 126 is primarily used to store accounting information that must be kept when the meter is powered down. The BAM is also used for storing certain flags and other information that is necessary to the functioning of the microprocessor. Such information includes meter identifying data such as the meter serial number and BAM initialization date, and a number of parameters relevant to the remote setting of the meter.

How the Security Lock Flag is Set

Figure 18:
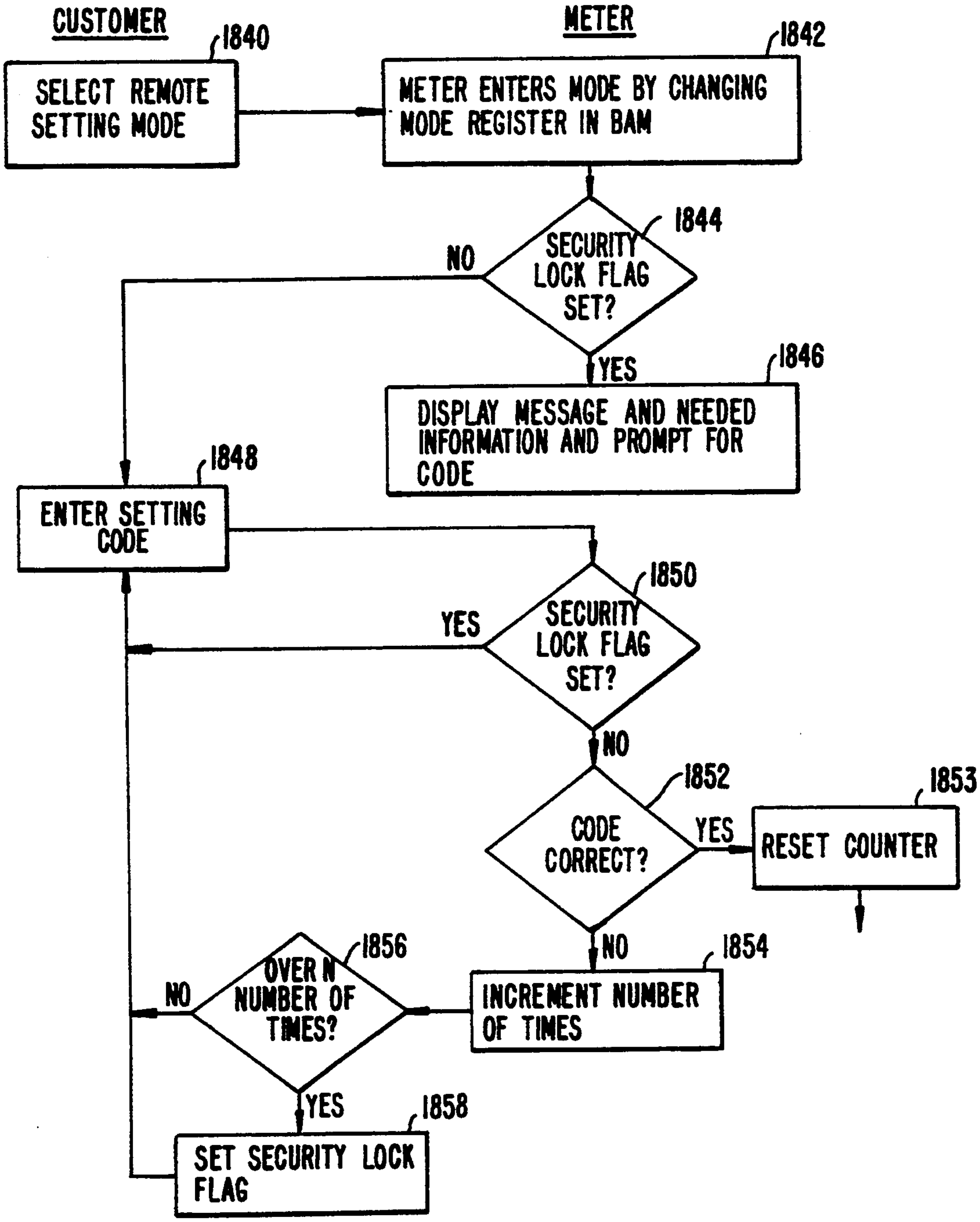
FIG. 18 is a detailed flowchart of the manner in which the security lock flag is set.

FIG. 18 is a detailed flow chart of the manner in which the security lock flag is set. Once the customer has a remote setting code for remotely setting the meter (or is attempting to remotely set the meter without the remote setting code), the customer puts the meter in a remote setting mode (step 1840) by pressing a certain key sequence. The meter enters the remote setting mode by setting a mode register located in BAM (step 1842). This prevents the meter from being used for printing purposes while being reset. The meter then determines whether the security lock flag has already been set (step 1844). If so, the meter then displays a message and other needed information such as the security lock code (step 1846). The customer is then unable to continue the remote setting process until the security lock flag has been cleared by the procedure shown in FIGS. 20–23.

If the security lock flag has not already been set, the customer may then continue the remote setting procedure. The customer enters the remote setting code (step 1848). The meter then checks whether the security lock flag has already been set (step 1850). If so, then the customer is returned to step 1848 as if the remote setting code were incorrect. If the security lock flag has not been set, then the meter determines whether the remote setting code is correct (step 1852). If the code is correct, then the meter resets the counter to zero (step 1853), and the customer may continue the remote setting procedure (which is not shown as it does not directly relate to the present procedure). If the code is not correct, an increment in the number of times (step 1854) the customer has attempted setting the codes occurs. The meter then checks to see whether the customer has already attempted over a predetermined number of allowed attempts (step 1856). If the customer has attempted less than the predetermined number of allowed attempts, then the meter returns the customer to the step of entering the remote setting code. If the customer has attempted over the predetermined number of allowed attempts then the security lock flag in BAM is set (step 1858) and the meter returns the customer to the step of entering the remote setting code.

Method for Clearing the Meter Security Lock Flag

Figure 19:
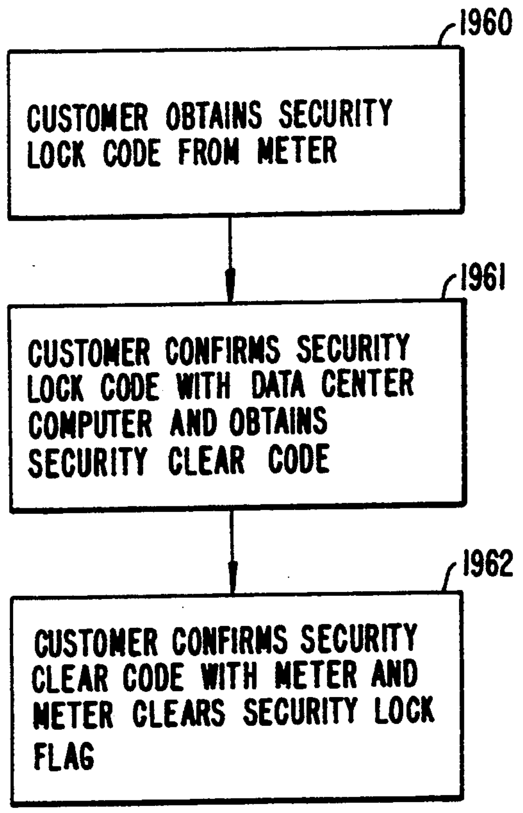
FIG. 19 is a high level flowchart of the process for clearing the security lock flag.

FIG. 19 is a high level flow chart of the process necessary for clearing the security lock flag in the meter. In a first stage 1960, the customer obtains a security lock code generated by the meter. This security lock code is essentially a password to the data center computer, and is based upon a combination of factors, the combination of which only the data center computer would know. In a second stage 1961, the customer confirms the security lock code with the data center computer. Upon confirmation from the computer, the computer provides a security clear code back to the customer. The security clear code is essentially a password from the data center computer to the meter stating that it is permissible to clear the security lock flag. In a third stage 1962, the customer enters the security clear code to the meter. The meter confirms the security clear code and clears the security lock flag.

Figure 20:
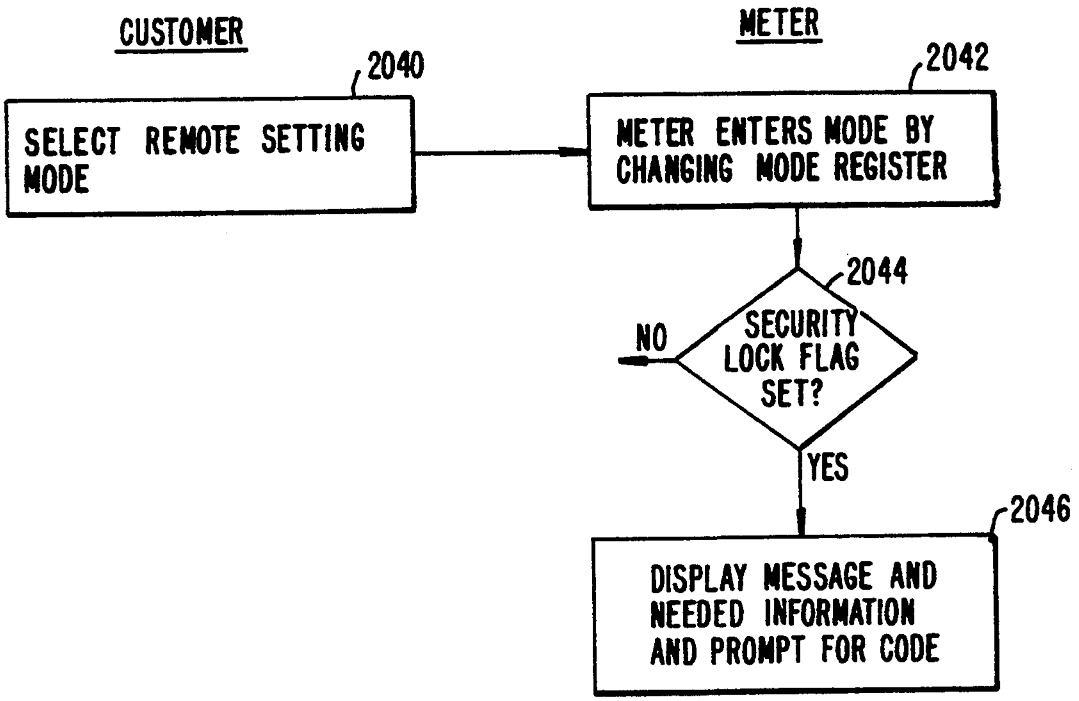
FIG. 20 is a detailed flowchart of the procedure for the customer to obtain a security lock code generated by the meter.

FIG. 20 is a detailed flow chart of stage 1960 as shown in FIG. 19. In a first step 2040 (corresponding to step 1840 of FIG. 18), the customer presses a certain key sequence, causing the meter to enter a remote setting mode.

The meter enters the remote setting mode by setting a mode register located in BAM (step 2042). The meter then determines whether the security lock flag has been set (step 2044). If so, the meter then displays a message and other needed information (step 2046). In a preferred embodiment, the meter displays the security lock code. In a second embodiment, the meter displays the Control Register amount with the security lock code. The customer should write these numbers down on a separate piece of paper for later use in the method.

FIGS. **21*a* and 21*b* are detailed flow charts of stage 1961 as shown in FIG. 19**. The customer establishes communication with the data center computer over a standard telephone. In the preferred and second embodiments, the customer may communicate to the data center computer with a telephone communications device that includes a user interface and a modem. Alternative embodiments can utilize a telephone by pressing the keys on a touch tone phone or by voice recognition over the telephone.

The customer first enters a request code for clearing the security extension flag (step 2170). The customer then enters the customer account number (step 2172) and the meter serial number which can be found on the exterior of the meter (step 2174).

The data center computer then determines whether the serial number is valid given the customer account number (step 2176). If the serial number is valid then the customer may continue, otherwise the customer is notified (step 2178) and is given the opportunity to decide whether to try again (step 2180). If the customer does not decide to try again, the customer should then contact his agent in order to determine how to clear up this problem.

If the serial number is valid, then the customer enters the amount of the control register (step 2184) obtained earlier in the procedure. The customer then enters the security lock code which was also obtained from the meter in the procedure above (step 2186). The computer then generates a security lock code in a like manner (step 2188) and compares that code to that entered by the customer (step 2190). If the codes are not equal, then the customer is notified (step 2192) and is given the opportunity to try again.

If the codes are equal, then the computer determines whether the control register amount is valid (step 2196). The control register amount is valid if the control register amount is equal to any prior system control register amounts stored on the computer. The control register amount is not valid if it is equal to the present system control register amount. If the control register amount is not valid, then the customer is notified and the occurrence of the invalid control register amount is logged in the computer (step 2198).

If the control register amount is valid, then the customer enters the current remote setting code (step 2100). The computer then determines whether it is a valid code (step 2102). If the remote setting code is not valid, then the computer passes the customer to a live operator for assistance (step 2104). If the remote setting code is valid, then the computer generates a security extension code (step 2106), increments the CTID (step 2108), flags that this event has occurred (step 2110), and displays or returns the security extension code to the customer for use further in this method (step 2112).

Figure 22:
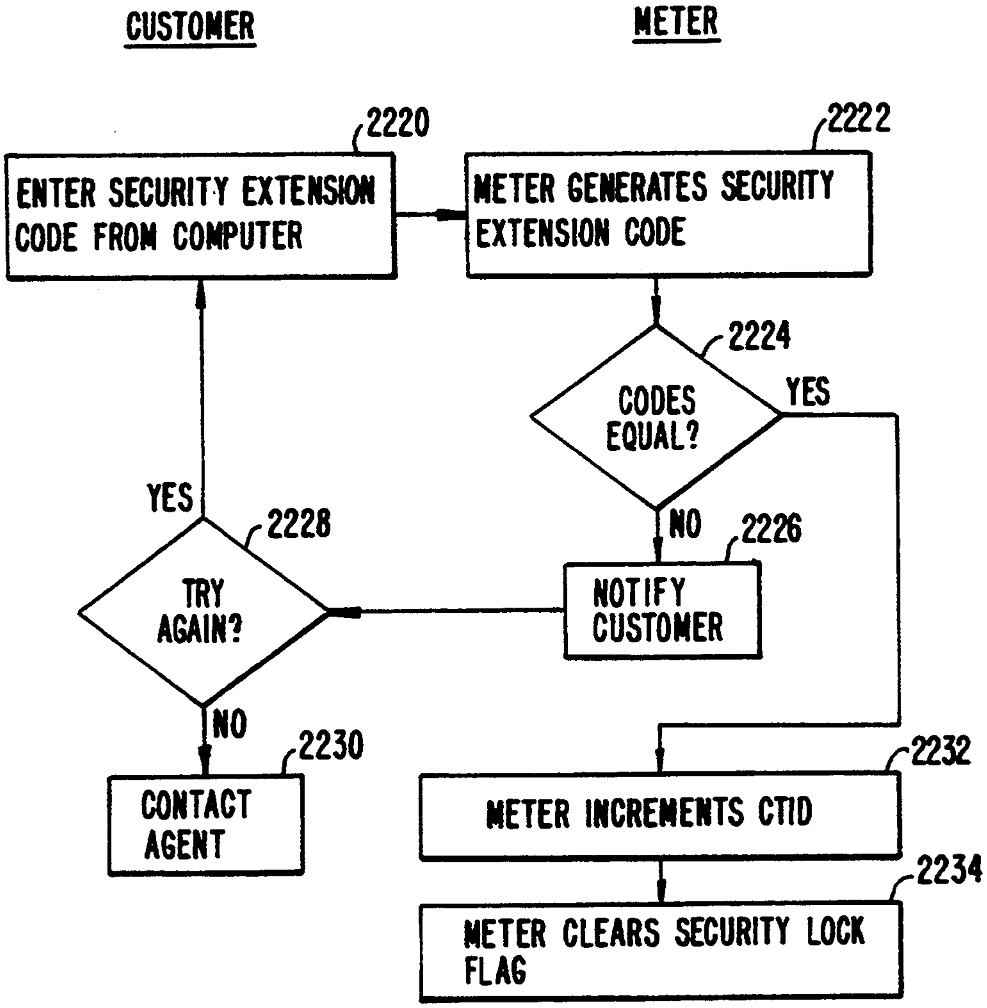
FIG. 22 is a detailed flowchart of the procedure for the customer to clear the security lock flag.

FIG. 22 is a detailed flow chart of stage 1962 shown above in FIG. 19. The customer enters the security clear code obtained from the computer into the meter (step 2220). The meter then generates its own security clear code (step 2222) and compares the computer generated code with the meter generated code (step 2224). If the codes are not equal, then the customer is notified (step 2226) and the customer is given an opportunity to try again or contact an agent (step 2230). If the codes are equal, then the meter increments the CTID such that it is equal to the CTID stored in the computer (step 2232), the meter clears the security lock flag (step 2234) and the meter enters the remote setting mode by changing the mode register in BAM (step 2236).

Encryption Technique

In order to perform the above procedure in the secure manner and to confirm certain data, the security code and the security clear code are generated by an encryption routine, stored both in the meter ROM and in the data center computer. The encryption routine is a nonlinear algorithm that generates a number that is apparently random to an outside person. The encryption routine is performed by an encryption program in combination with a permanent encryption table. In the preferred and second embodiments, encryption routine uses a 16-digit (or 64-bit) key and a 16-digit input number.

In the first embodiment, the security lock code is generated by the encryption routine performed on the CTID as the key and a combination of the STID and the Control Register amount as the input number. In the second embodiment, the key is composed of the serial number and the BAM initialization, and the input number is composed of the STID and the Control Register.

In the preferred and second embodiments, the security clear flag is generated by the encryption routine performed on the CTID as the key and a combination of the meter serial number and the STID as the input number.

The CTID is a 16-digit number that is stored in BAM. The initial value of the CTID is obtained by performing an algorithm upon the BAM initialization date in combination with the meter serial number. The BAM initialization date is used to prevent starting with the same CTID every time the meter is initialized. The algorithm is not stored in the meter for security reasons. The CTID is then incremented by a non-linear algorithm after the security lock flag is cleared.

The codes obtained by the encryption routine are 16-digits long. The lower digits of the codes are then communicated to the customer by the meter or the data center computer. The number at lower digits that we communicated by the HSL value.

While the above is a complete description of the preferred embodiment of the invention in part IV, various modifications, alternative constructions, and equivalents may be used. For example, the electronics of the resettable meter may be structured differently. Furthermore, the security lock flag or another flag can be used to prevent other forms of memory modification when an improper code is entered a predetermined number of times.

The above systems provide the capability to perform functions not previously available to computerized meter resetting systems (CMRS) before. According to a particular embodiment of the invention, the system enables tracking of the lifecycle of a postage meter.

Figure 23:
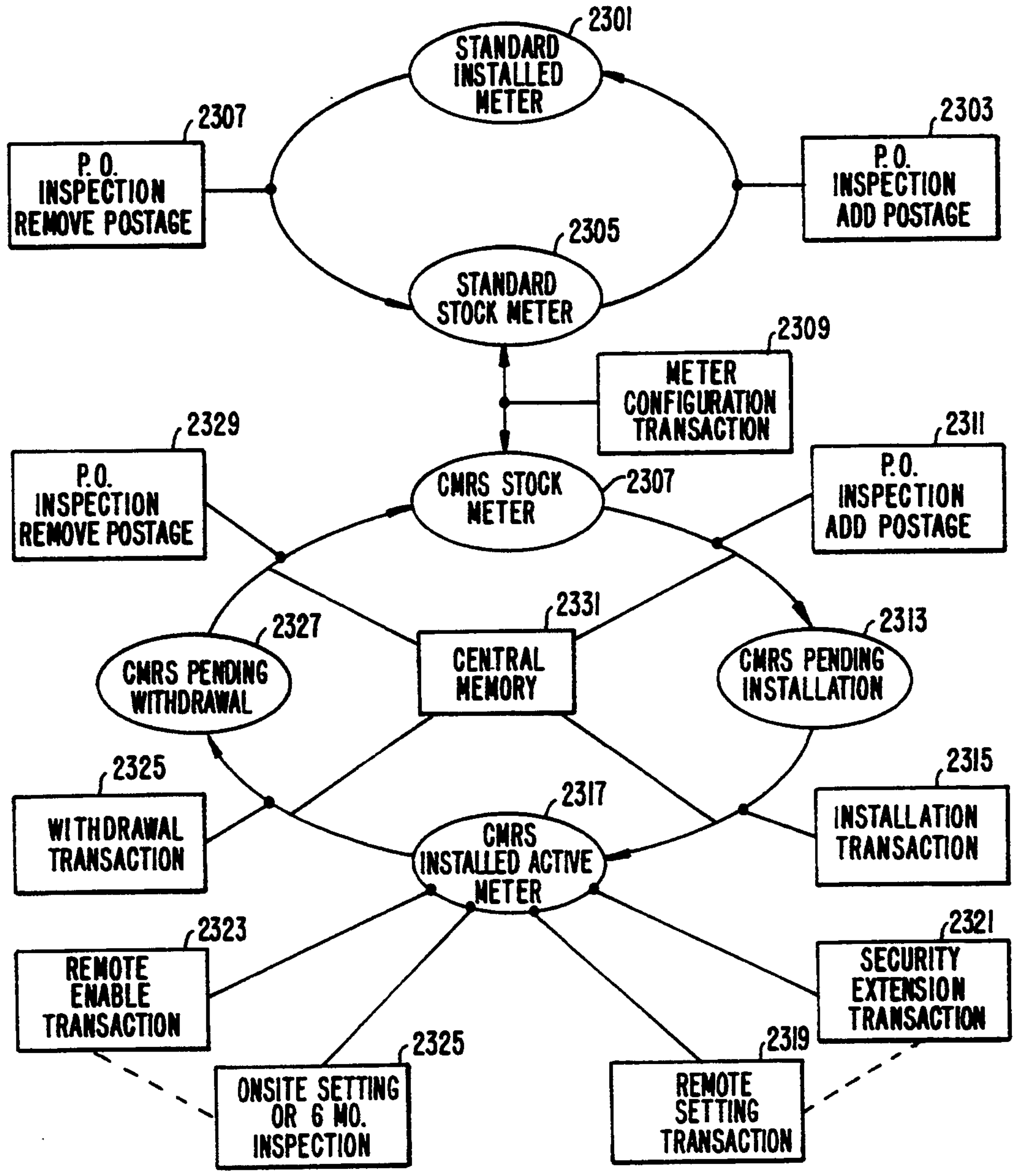
FIG. 23 illustrates the meter lifecycle monitoring.

FIG. 23 illustrates the prior lifecycle of a meter prior to the present inventions, and compares it with the system described herein. In particular, as shown in FIG. 23, conventional meters are installed in the field at step 2301. After the meter has been used for a period of time it may be returned to stock as shown in step 2305, receiving a postal inspection and postage removal at step 2307. The meter may be returned to the field as shown, receiving a postal inspection and postage addition as shown in step 2303.

As shown in the lower portion of FIG. 23, the present inventions enable lifecycle tracking of the machine. In particular, as shown at step 2307 the meter is originally in stock, and may have been provided with the features herein with meter configuration transactions 2309. At step 2311, the post office inspects the meter and adds initial postage, and is pending installation at step 2313. At step 2315 an installation transaction occurs and the meter is installed as shown in step 2317. As an active meter, remote setting transactions and security extension transactions occur as shown in steps 2319 and 2321 along with remote enabling transactions 2323 and inspections 2325.

After the meter has been used at a location, it will be subjected to a withdrawal transaction 2325, at which stage it will for a period of time be placed in a pending withdrawal state 2327 and later returned to stock after a postal inspection 2329.

According to a preferred embodiment of the invention, the present invention provides for the maintenance of records at central memory 2331 of all of the above transactions. Accordingly, it becomes possible to track the location, usage, service needs, and the like of every meter in the field. This database provides information relating to customer needs and features that are not needed, customer usage information, and a wide variety of details not previously available regarding customer usage.

The emergency remote resetting feature described above provides additional capabilities, i.e., monitoring of and automatic reminder generation and verification for postal service inspection. According to this aspect of the invention the customer is provided with reminders of the need for postal service inspections of a meter.

Figure 24:
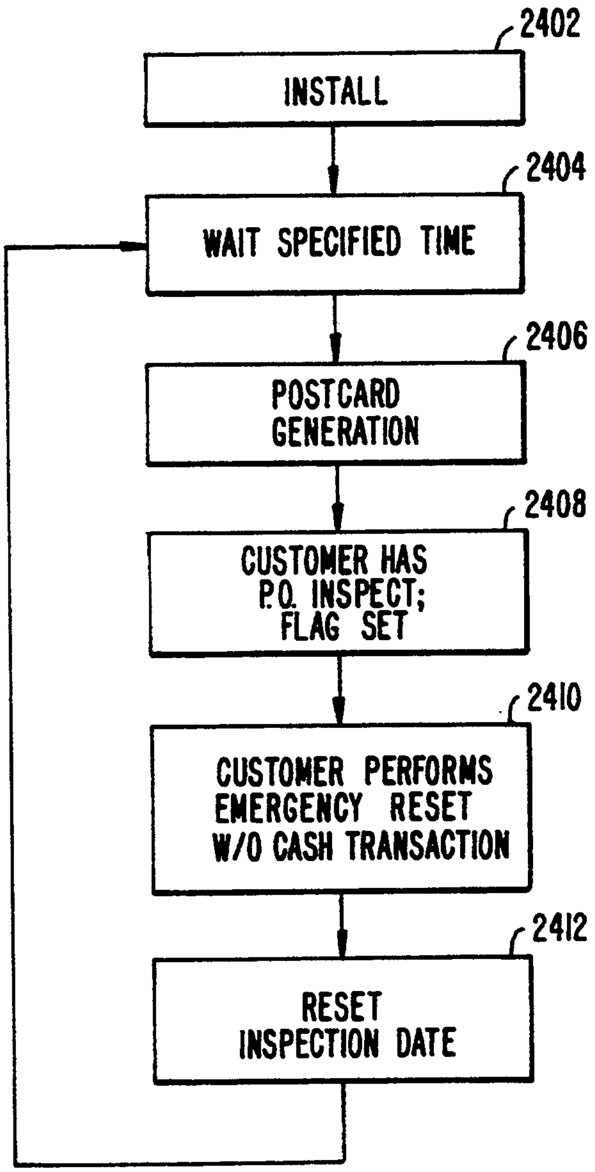
FIG. 24 illustrates a post office inspection system.

As shown in FIG. 24, the meter is installed at step 2402 using an installation procedure 2315. After waiting a specified period of time at step 2404, the central data computer generates a reminder postcard or the like at step 2406 advising the customer that a postal service inspection is required. At step 2408 the postal clerk inspects the meter, setting a flag in the meter, for example, inserting the postal service key in the meter. In next using the meter, the customer is forced to conduct an emergency remote resetting of the meter at step 2410 (as described extensively above), but adds no postage to the meter in the process. This advises the central data computer that the postal inspector has inspected the meter, and resets the inspection date in the process to a new date. The process then repeats from the waiting step 2404.

The above description and illustration should not be taken as limiting the scope of the present invention, which is defined by the appended claims.

What is claimed is:

1. An electronic postage meter having a postage amount that can be remotely set by the entry of a remote setting code, the meter comprising:

(a) detection means for detecting the entry of an invalid remote setting code a predetermined consecutive number of times;

(b) prevention means, responsive to the detection means, for selectively preventing the postage amount from being remotely set upon the entry of an invalid remote setting code the predetermined consecutive number of times;

(c) generating means for generating a first meter code and a second meter code, said generating means firmly engaged with the meter;

(d) display means, coupled to the generating means, for displaying the first meter code;

(e) entry means for entering a non-meter code different from said remote setting code, said non-meter code generated at a data center computer by receiving said first meter code;

(f) comparison means, coupled to the generating means and the entry means, for comparing the second meter and non-meter codes; and (g) enabling means, responsive to the comparison means, for disabling the prevention means upon the second meter and non-meter codes being equal so as to reenable entry of said remote setting code.

2. An electronic postage meter having memory capable of being modified by entry of a remote setting code, the meter comprising:

(a) detection means for detecting the entry of an invalid remote setting code a predetermined number of times;

(b) prevention means, responsive to the detection means, for selectively preventing the modification of memory upon the entry of an invalid remote setting code the predetermined number of times;

(c) generating means for generating a display code and an internal meter code in said postage meter upon activation of said prevention means;

(d) display means, coupled to said generating means, for displaying said display code;

(e) entry means for entering a data center code different from said remote setting code, said data center code generated at a data center computer, said data center code retrievable from the data center computer by a user communicating said display code and said valid remote setting code to said data center computer;

(f) comparison means, coupled to the generating means and the entry means, for comparing the internal meter and data center codes; and (g) enabling means, responsive to the comparison means, for disabling the prevention means upon the internal meter and data center codes being equal, said enabling means reenabling entry of a valid remote setting code.

3. The electronic postage meter of claim 2 further comprises second generating means for generating a second display code, said second generating means coupled to said display means.

4. An electronic postage meter having a postage amount that can be remotely set by entry of a remote setting code, the meter comprising:

(a) detection means for detecting the entry of an invalid remote setting code a predetermined number of times;

(b) prevention means, responsive to the detection means for selectively preventing the postage amount from being remotely set upon the entry of an invalid remote setting code the predetermined number of times;

(c) generating means for generating an internal meter code in said postage meter upon activation of said prevention means;

(d) entry means for entering a data center code different from said remote setting code, said data center code generated at a data center computer, said data center code retrievable from the data center computer by a user communicating information indicating that said user is authorized to have the remote setting code;

(e) comparison means coupled to the generating means and the entry means for comparing the internal meter and data center codes; and (f) enabling means responsive to the comparing means, for disabling the prevention means upon the internal meter and data center codes being equal so as to enable entry of said remote setting code.

5. The electronic postage meter of claim 4 further comprising:

(a) second generating means for generating a display code; and (b) display means, coupled to the second generating means, for displaying the display code.

6. The electronic postage meter of claim 4 further comprising a print means for printing postage not greater than the postage amount.

7. The electronic postage meter of claim 6 wherein the prevention means further prevents the print means from printing postage upon the entry of an invalid remote setting code the predetermined number of times.

8. The electronic postage meter of claim 4 further comprising enabling means for enabling the postage amount to be remotely set upon the entry of a second non-meter code.

* * * * *